United States Patent
Morikawa

(10) Patent No.: US 6,918,011 B2
(45) Date of Patent: Jul. 12, 2005

(54) CACHE MEMORY FOR INVALIDATING DATA OR WRITING BACK DATA TO A MAIN MEMORY

(75) Inventor: Shun Morikawa, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 322 days.

(21) Appl. No.: 10/383,520

(22) Filed: Mar. 10, 2003

(65) Prior Publication Data

US 2004/0049637 A1 Mar. 11, 2004

(30) Foreign Application Priority Data

Sep. 11, 2002 (JP) .................................. 2002-265871

(51) Int. Cl.$^7$ .............................................. G06F 12/00
(52) U.S. Cl. .................................. 711/143; 711/144
(58) Field of Search ................................ 711/141–145

(56) References Cited

U.S. PATENT DOCUMENTS 5,860,110 A * 1/1999 Fukui et al. ................. 711/141

FOREIGN PATENT DOCUMENTS

JP     2001-134490     5/2001

OTHER PUBLICATIONS

"Section 4 Caches", SuperH™(SH)32–Bit RISC MCU/MPU Series, SH7751, High Performance RISC Engine, Hardware Manual (ADE–602–201, Rev. 1.0), Hitachi, Ltd., Apr. 10, 2000, pp. 61–81.
"Chapter 5 Caches and Write Buffer", ARM 1022E™ Technical Reference Manual (ARM DDI 0237A), ARM Limited., 2001, pp. 5.1–5.18.

* cited by examiner

Primary Examiner—Matthew D. Anderson
(74) Attorney, Agent, or Firm—Burns, Doane, Swecker & Mathis, LLP

(57) ABSTRACT

Information specifying invalidating areas of a main memory is stored in an area specifying register. Each time a signal indicating an index address is input to a tag memory and a data memory, cached data of the index address of a data memory is output, a tag address is output from a tag memory. A combined address of the tag address and the index address indicates an address of the main memory from which data is written at the index address of the data memory. Thereafter, it is judged whether or not an area of each combined address of the main memory agrees with one of the invalidating areas. In case of the agreement of the area of each combined address and one invalidating area, the invalidating processing is performed for the cached data of the index address corresponding to the combined address.

10 Claims, 10 Drawing Sheets

CACHE MEMORY FOR INVALIDATING DATA OR WRITING BACK DATA TO A MAIN MEMORY

BACKGROUND OF THE INVENTION

1. Field of the Invention

The present invention relates to a cache memory in which invalidating processing or copy-back processing is performed to invalidate data of only a data block of a specified address or to write back the data to a main memory.

2. Description of Related Art

A cache memory and a main memory are used for a large scale integration circuit (hereinafter, called LSI) having a central processing unit (hereinafter, called CPU). That is, pieces of data of a part of areas of the main memory are written in data blocks of the cache memory. Also, a bus master such as a direct memory access controller (hereinafter, called DMA controller) impossible to perform a cache access to the cache memory is used for a direct memory access. In a case where the bus master not performing the cache access gains access to the main memory to perform a DMA transfer between the main memory and another main memory or a memory other than the cache memory, to maintain the coherency between pieces of data of a part of areas of the main memory and pieces of data of the data blocks of the cache memory, invalidating processing and/or copy-back processing are first performed for the cache memory according to a software (or a program) executed in the CPU. Thereafter, the DMA transfer is performed under control of the bus master.

Because data of the main memory is changed to updated data due to the DMA transfer, data of each data block of the cache memory differs from updated data of the corresponding area of the main memory. Therefore, pieces of data of the cache memory are invalidated in the invalidating processing.

Also, in a case where updated data transmitted from the CPU through a data bus is written in a remarked data block of the cache memory, the updated data stored in the remarked data block of the cache memory differs from old data stored in a corresponding area of the main memory. When the bus master gains access to the main memory to read out data of the main memory in the DMA transfer, it is required to change the old data of the main memory to the updated data before the DMA transfer. Therefore, the copy-back processing is performed for the cache memory and the main memory to write back the updated data of the remarked data block of the cache memory to the corresponding area of the main memory.

FIG. 8 is a block diagram of a conventional cache memory. In FIG. 8, a conventional cache memory has a memory access control unit 1, a tag memory 2 and a data memory 3. The tag memory 2 and the data memory 3 are respectively operated in synchronization with a clock signal. The memory access control unit 1 controls the tag memory 2 and the data memory 3 by sending a plurality of control signals (memory enable signals, write enable signals, address input signals and data input signals) to the tag memory 2 and the data memory 3. In the data memory 3, a plurality of data blocks are placed to store pieces of cached data sent from a main memory (not shown). In the tag memory 2, pieces of tag information are stored in a plurality of entries. Each data block placed in the data memory 3 is specified according to the tag information stored in the corresponding tag block of the tag memory 2. A memory enable signal S10 is input to the tag memory 2 to control an access operation to the tag memory 2. A write enable signal S11 is input to the tag memory 2 to control the writing of data to the tag memory 2. An address input signal S12 is input to the tag memory 2 to specify an address of a specific tag block. A data input signal S13 indicating data is input to the tag memory 2 to write tag information in the specific tag block of the tag memory 2 specified by the address input signal S12. A memory enable signal S15 is input to the data memory 3 to control an access operation to the data memory 3. A write enable signal S16 is input to the data memory 3 to control the writing of data to the data memory 3. An address input signal S17 indicating the same address as that indicated by the address input signal S12 is input to the data memory 3 to specify an address of a specific data block. A data input signal S18 indicating data output from the main memory and the CPU is input to the data memory 3 to write the data in a data block of the data memory 3 specified by the address input signal S17. Circuits relating to the access operation performed under the control of a CPU (not shown) are omitted in FIG. 8.

In a read operation for the conventional cache memory, a data output signal S14 indicating tag information is output from the tag memory 2. A data output signal S19 indicating output data is output from the data memory 3.

The tag information of each tag block of the tag memory 2 is output with the cached data of the corresponding data block of the data memory 3. This tag information includes a tag address indicating a part of an address of an area of the main memory corresponding to the tag block of the tag memory 2, and a combined address obtained by combining the tag address and the address indicated by the address input signal S12 indicates the address of the area of the main memory corresponding to the data block of the data memory 3. Also, in a case where a request of the invalidating processing or the copy-back processing is sent to the memory access control unit 1, the invalidating processing or the copy-back processing is performed in the conventional cache memory.

The tag information stored in each tag block of the tag memory 2 has a valid bit and a dirty bit. The valid bit of the tag information indicates whether cached data stored in the corresponding data block of the data memory 3 is valid or invalid. The dirty bit of the tag information indicates whether or not cached data of the corresponding data block of the data memory 3 differs from original data in the main memory and whether or not it is required to write back the cached data to the main memory.

Next, an operation of the invalidating processing will be described below.

FIG. 9 is a timing chart of the invalidating processing performed for all areas of the conventional cache memory shown in FIG. 8.

In FIG. 9, in a case where the memory enable signal S10 set to a high level and the write enable signal S11 set to a high level are output from the memory access control unit 1 to the tag memory 2, the write access is performed for the tag memory 2 in synchronization with a clock signal S30. Also, in a case where the memory enable signal S10 set to the high level and the write enable signal S11 set to a low level are output from the memory access control unit 1 to the tag memory 2, the read access is performed for the tag memory 2 in synchronization with the clock signal S30.

When the CPU recognizes that the invalidating processing for the conventional cache memory is needed, an invalidating processing request signal S31 set to a high level is transmitted from the CPU to the memory access control unit 1 according to a software (or a program) executed in the CPU.

In response to the invalidating processing request signal S31 of the high level, the memory access control unit 1 controls the tag memory 2 and the data memory 3. In detail, the memory enable signal S10 set to the high level and the write enable signal S11 set to the high level are input to the tag memory 2. Also, an address input signal S12 indicating a top address "0" of the tag memory 2 is input to the tag memory 2 with a data input signal S13 indicating a valid bit set to "0" in synchronization with the clock signal S30.

In the tag memory 2, the valid bit set to "0" is written in a tag block of the tag memory 2 specified by the address input signal S12. The valid bit set to "0" indicates that the cached data of the corresponding data block of the data memory 3 is invalid. Also, a valid bit set to "1" indicates that the cached data of the corresponding data block of the data memory 3 is valid.

Thereafter, in the memory access control unit 1, the address input signal S12 is incremented to specify a next address of the tag memory 2 corresponding to a next data block of the data memory 3, and a valid bit set to "0" is written in a next tag block of the next address of the tag memory 2 in the same manner. This writing operation is performed for all addresses of the tag memory 2. When the writing operation of the valid bit for all addresses ranging from the top address "0" to a final address "N" is completed, all tag blocks of the tag memory 2 have the valid bit set to "0", and the invalidating processing is completed.

Next an operation of the copy-back processing will be described below.

FIG. 10 is a timing chart of the copy-back processing performed for all areas of the conventional cache memory shown in FIG. 8.

In FIG. 10, a copy-back processing request signal S32 is output from the CPU to the cache memory. In a case where data of the cache memory is written back to the main memory, a busy signal S33 is set to a high level. Also, the busy signal S33 is set to a low level in a case where the writing-back of data to the main memory is completed. The busy signal S33 set to the high level is transmitted from the CPU to the memory access control unit 1 to temporarily stop the read access performed under the control of the memory access control unit 1 during the writing-back to the main memory. A dirty bit S34 set to a high level is included in the data output signal S14. The dirty bit S34 of the high level indicates that the writing-back of data to the main memory is needed due to the difference between data of the cache memory and data of the main memory. This difference occurs when data transmitted from the CPU is written in the cache memory.

When the CPU recognizes the necessity of the copy-back processing, a copy-back processing request signal S32 set to the high level is transmitted from the CPU to the memory access control unit 1 according to a software (or a program) executed in the CPU. Also, in the memory access control unit 1, in response to the copy-back processing request signal S32 of the high level, memory enable signals S10 and S15 set to the high level are input to the tag memory 2 and the data memory 3 respectively, and address input signals S12 and S17 indicating the top address "0" of the tag memory 2 and the top address "0" of the data memory 3 respectively are input to the tag memory 2 and the data memory 3 respectively.

Thereafter, the valid bit and the dirty bit S34 are output as a data output signal S14 from the tag block of the tag memory 2 specified by the address input signal S12. Also, data is output as a data output signal S19 from a data block of the data memory 3 indicated by the address input signal S17. In a case where the valid bit set to "1" (or high level) and the dirty bit set to "1" (or high level) are output, because the data output from the data memory 3 is valid, the writing-back of the data from the data memory 3 to the main memory is needed. In contrast, in a case where the valid bit set to "0" (or low level) or the dirty bit set to "0" (or low level) is output, the writing-back of the data from the data memory 3 to the main memory is not needed.

In a case where the valid bit set to "0" or the dirty bit set to "0" included in the data output signal S14 is received in the CPU, the address input signals S12 and S17 are incremented by the memory access control unit 1 so as to indicate a next address of the tag memory 2 and a next address of the data memory 3 respectively, and none of other signals is changed. In contrast, in a case where the valid bit set to "1" and the dirty bit set to "1" are received in the CPU, because the copy-back processing is performed in following clock cycles as described later, the dirty bit set to "1" is not needed. Therefore, in the memory access control unit 1, the write enable signal S11 is set to the high level, the address input signals S12 and S17 indicating the same addresses of the tag memory 2 and the data memory 3 are again input to the tag memory 2 and the data memory 3 respectively, and the dirty bit set to "0" is written in a tag block specified by the address input signal S12.

When the valid bit set to "1" and the dirty bit set to "1" are received in the CPU, the CPU judges that the writing-back of the data to the main memory is needed, the data output from the data memory 3 is written back to the main memory in following clock cycles. During the writing-back of the data, the CPU sets the busy signal S33 to the high level, and the memory access control unit 1 sets the memory enable signals S10 and S15 to the low level together. Though the address input signals S12 and S17 are incremented by the memory access control unit 1 in response to the leading edge of the busy signal S33, the increment of the address input signals S12 and S17 is stopped during both a time period of the high level of the busy signal S33 and one clock cycle after the time period.

When the writing-back of the data to the main memory is completed, the busy signal S33 is set to the low level by the CPU, the memory enable signals S10 and S15 are again set to the high level together, the read access to the tag memory 2 and the data memory 3 is restarted by using the address input signals S12 and S17 already incremented, and the read operation for a next address of the tag memory 2 and a next address of the data memory 3 is performed in the same manner. Thereafter, tag information and data are read out from the tag memory 2 and the data memory 3 one after another. When the writing-back of data of the final address "N" is completed, the copy-back processing is completed.

The invalidating processing and the copy-back processing described above are performed for all areas of the cache memory. Also, as is disclosed in a patent literature (pp. 3–8, FIG. 1 and FIG. 2 of Published Unexamined Japanese Patent Application No. 2001-134490), the invalidating processing and the copy-back processing are performed for a specified entry or a plurality of specified entries of the cache memory, or the invalidating processing and the copy-back processing are performed for a data block or a plurality of data blocks of the cache memory corresponding to an address or a plurality of addresses.

Also, in a case where a bus master such as a DMA controller gains access to specific areas of a main memory to perform a DMA transfer for the specific areas of the main memory, the invalidating processing and the copy-back processing are performed before the DMA transfer.

However, because the conventional cache memory has the above-described configuration, when the bus master gains access to a part of areas of the main memory, even though the part of areas of the main memory do not correspond to all areas of the conventional cache memory, the invalidating processing and the copy-back processing are inevitably performed for all areas of the conventional cache memory. In detail, in a case where a remarked data block of the data memory 3 does not correspond to any of the areas of the main memory relating to the accessing of the bus master, the invalidating of data of the remarked data block of the data memory 3 is not needed. However, data of the remarked data block not needed to be invalidated is undesirably invalidated. Therefore, when the CPU gains access to the conventional cache memory to read out data from the remarked data block of the data memory 3, there is high probability that the CPU cannot get the data from the conventional cache memory. In other words, the cache miss occurs at high probability. In a case where the cache miss occurs, a cache replacement is performed to write data of an area of the main memory corresponding to the remarked data block of the data memory 3. Therefore, because the cache replacement for the conventional cache memory is many times performed, a problem has arisen that the processing time for the cache replacement many performed is required.

Also, in a case where a remarked data block of the data memory 3 does not correspond to any of the areas of the main memory relating to the accessing of the bus master, the writing-back of data of the remarked data block of the data memory 3 to the main memory is not needed. However, in a case where the valid bit of "1" and the dirty bit of "1" are set in a tag block of the tag memory 2 corresponding to the remarked data block of the data memory 3, data of the remarked data block not needed to be written back to the main memory is written back to the main memory in the copy-back processing. Therefore, another problem has arisen that the processing time is required in vain to perform the writing-back operation for data not needed to be written back.

Also, even in a case where the invalidating processing and the copy-back processing are performed in the conventional cache memory by specifying each entry of the conventional cache memory according to a software architecture, the invalidating processing and the copy-back processing are performed for all data blocks of the specified entries. Therefore, the same problems occur. Also, in a case where the invalidating processing and the copy-back processing are performed while specifying each address of the conventional cache memory by using a software architecture, it is required to specify each address, for which the invalidating processing and the copy-back processing are needed, by using the software architecture. Therefore, another problem has arisen that the processing time is increased as a size of an area requiring the invalidating processing or the copy-back processing is enlarged.

In the patent literature, it is disclosed that the invalidating processing or the copy-back processing are performed only for areas of a main memory needing the invalidating processing or the copy-back processing by sending a request from the CPU to the main memory only once. In detail, in a case where the invalidating processing or the copy-back processing for the main memory and a cache memory is needed, areas of the main memory to be processed according to the invalidating processing or the copy-back processing are first specified, addresses from a top address to a final address in the specified areas of the main memory are specified one after another while incrementing the specified address, and the invalidating processing or the copy-back processing for a data block of the cache memory corresponding to each specified address of the main memory is performed.

However, there is a case where an address size of the areas of the main memory to be processed according to the invalidating processing or the copy-back processing is considerably large as compared with a size of a cache memory. For example, a cache memory having an address size of 1 KB is used for a main memory, and areas of the main memory corresponding to the invalidating processing have an address size of 1 MB. In this case, an examined address of the main memory is set while incrementing the examined address in the address area of 1 MB, and it is examined whether or not data of each examined address of the main memory is cached in a data block of the cache memory. If data of one examined address of the main memory is cached in a data block of the cache memory, it is required to perform the invalidating processing for the cached data of the data block of the cache memory corresponding to the examined address of the main memory. In this case, each time it is examined whether or not data of one examined address of the main memory is cached in the cache memory, it is required that the CPU gains access to the cache memory. Therefore, a problem has arisen that it takes a lot of processing time to perform the invalidating processing for the main memory having a large size and the cache memory.

SUMMARY OF THE INVENTION

An object of the present invention is to provide, with due consideration to the drawbacks of the conventional cache memory, a cache memory in which the invalidating processing or the copy-back processing is performed for a data block or a plurality of data blocks of an area specified by a request of a CPU so as to reduce a processing time required in the invalidating processing or the copy-back processing and to heighten an efficiency in the use of a cache memory.

The object is achieved by the provision of a cache memory including a data memory, a tag memory, an area specifying unit for storing area information specifying an invalidating area of a main memory, a judging unit, and an access control unit. Address information indicating each address of the main memory is output from the tag memory to the judging unit. In the judging unit, it is judged whether or not each of data blocks of the data memory corresponds to the invalidating area of the main memory. In a case where a data memory corresponds to the invalidating area of the main memory, the valid information indicating invalidity is stored in a specific tag block of the tag memory corresponding to the specific data block of the data memory under control of the access control unit.

Also, in a case where area information specifying a copy-back area of the main memory is stored in the area specifying unit, the cached data of a specific data block of the data memory corresponding to the copy-back area of the main memory is written back to the copy-back area of the main memory.

Therefore, because it is judged whether or not the invalidating processing or the copy-back processing is needed for each of the data blocks of the data memory, the invalidating processing or the copy-back processing can be performed for a data block or a plurality of data blocks of an area specified by a request of a CPU so as to reduce a processing time required in the invalidating processing or the copy-back processing.

Also, in a case where the invalidating processing for cache data of a data block is not required, the cache data of the data block is not invalidated. Therefore, the efficiency in the use of the cache memory can be heightened.

DETAILED DESCRIPTION OF THE PREFERRED EMBODIMENTS

Embodiments of the present invention will now be described with reference to the accompanying drawings.
Embodiment 1

Figure 1:
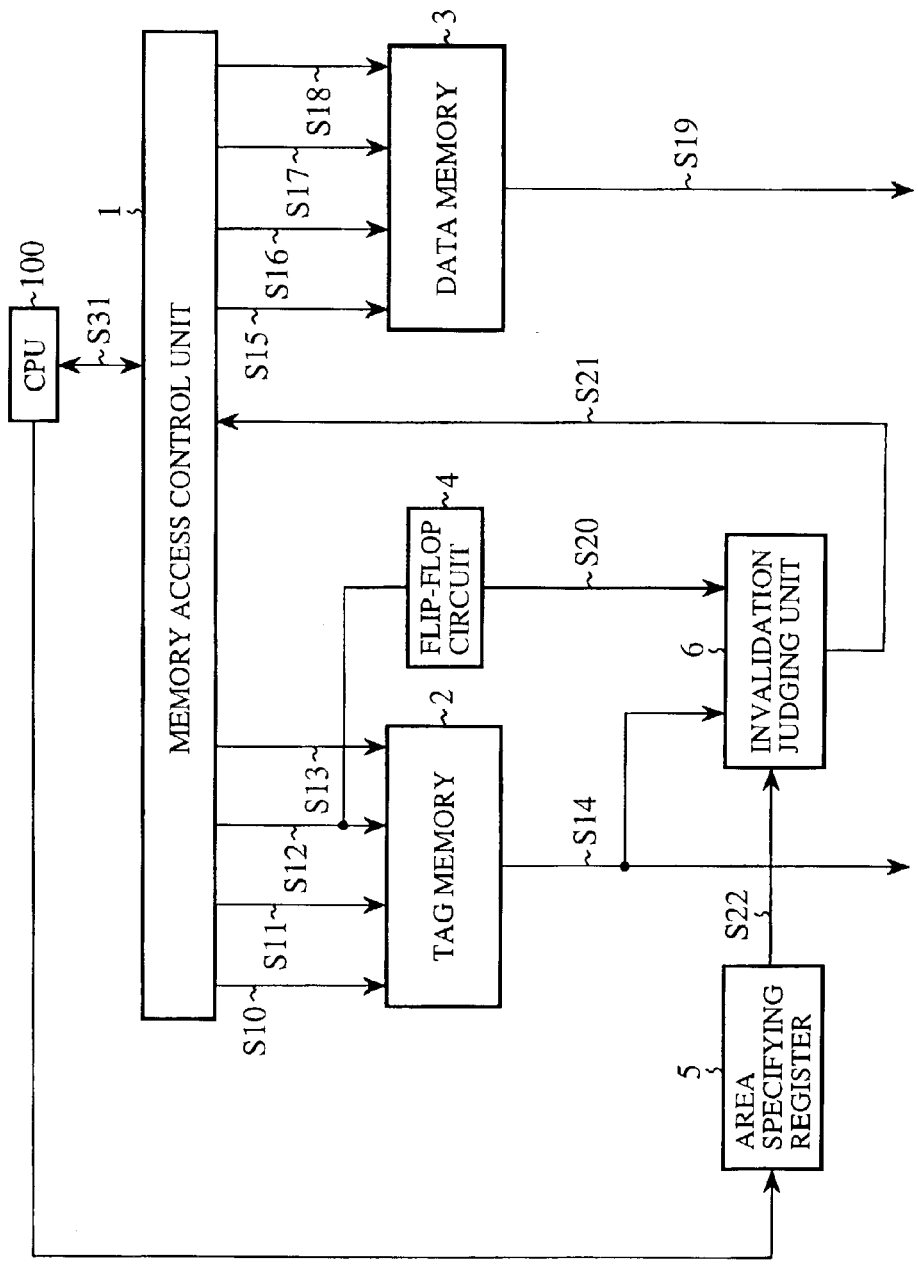
FIG. 1 is a block diagram of a cache memory according to a first embodiment of the present invention.

FIG. 1 is a block diagram of a cache memory according to a first embodiment of the present invention. In FIG. 1, a CPU 100 is connected to a cache memory to perform a read operation, a write operation, the invalidating processing and the copy-back processing for the cache memory under control of the CPU 100. The cache memory comprises a memory access control unit (or an access control unit) 1, a tag memory 2, a data memory 3, a flip-flop circuit 4, an area specifying register (or an area specifying unit) 5 and an invalidation judging unit (or a judging unit) 6.

The relation between addresses of a plurality of areas of a main memory (not shown) and addresses of a plurality of data blocks of the data memory 3 and the relation between the addresses of the main memory and addresses of a plurality of tag blocks of the tag memory 2 are set according to the direct mapping.

The addresses of the main memory are allocated to the areas of the main memory, and the main memory includes a plurality of caching addresses as a portion of the addresses. Pieces of data of a plurality of caching areas of the main memory specified by the caching addresses are stored in the data blocks of the data memory 3 as pieces of cached data.

The CPU 100 judges that the invalidation of pieces of cached data of invalidating data blocks of the data memory 3 corresponding to a plurality of invalidating addresses of a plurality of invalidating areas of the main memory is needed. The invalidating addresses of the main memory are included in the caching addresses, and pieces of data of the invalidating areas of the main memory specified by the invalidating addresses are possibly stored in the invalidating data blocks of the data memory 3 as the pieces of cached data.

The memory access control unit 1 controls a plurality of access signals (memory enable signals, write enable signals, address input signals and data input signals) to be transmitted to the tag memory 2 and the data memory 3. In the tag memory 2, pieces of tag information are stored in a plurality of data blocks. In the data memory 3, the data blocks are placed to store the pieces of cached data.

A memory enable signal S10 is input to the tag memory 2 to control an access operation performed for the tag memory 2. A write enable signal S11 is input to the tag memory 2 to control the writing of data to the tag memory 2. An address input signal S12 is input to the tag memory 2 to specify an address of a tag block. A data input signal S13 indicating data such as an address is input to the tag memory 2 to write the data in the tag memory 2. A memory enable signal S15 is input to the data memory 3 to control an access operation performed for the data memory 3. A write enable signal S16 is input to the data memory 3 to control the writing of data to the data memory 3. An address input signal S17 is input to the data memory 3 to specify an address of a data block for which the invalidating processing or the copy-back processing is required. A data input signal S18 indicating data is input to the data memory 3 to write the data in the data memory 3. The tag information of the tag block of the address specified by the address input signal S12 is output from the tag memory 2 as a data output signal S14. The cached data of the data block of the address specified by the address input signal S17 is output from the data memory 3 as a data output signal S19. Circuits relating to the access operation performed under the control of the CPU 100 are omitted in FIG. 1.

The tag information stored in each tag block of the tag memory 2 has a tag address (or address information), one valid bit (or valid information) and one dirty bit (or dirty information) set by the memory access control unit 1. The tag address of the tag information stored at an address of the tag memory 2 relates to a caching address of the main memory corresponding to both the address of the tag memory 2 and one address of the data memory 3. The valid bit of the tag information indicates whether data cached from the main memory to the corresponding data block of the data memory 3 is valid or invalid. The dirty bit of the tag information indicates whether or not the writing-back of data stored in the corresponding data block of the data memory 3 to the main memory is needed.

In the flip-flop circuit 4, the address input signal S12 input to the tag memory 2 is delayed by one clock cycle to output the address input signal S12 in synchronization with the data output signal S14 output from the tag memory 2. The address input signal S12 delayed by one clock cycle is input to the invalidation judging unit 6 as an address output signal S20.

In the area specifying register 5, area information specifying the invalidating areas of the invalidating addresses of the main memory is received from the CPU 100 and is stored. The area specifying register 5 has two registers. A start address of the invalidating areas of the main memory is stored in one register, and an ending address of the invalidating areas of the main memory or the number of invalidating areas of the main memory is stored in the other register. In a case where the CPU 100 recognizes that the invalidating processing is needed, both the start address of the invalidating areas of the main memory and the ending address of the invalidating areas of the main memory or the number of invalidating areas of the main memory are stored in the area specifying register 5 under the control of the CPU 100.

In the invalidation judging unit 6, an address information output signal S22 output from the area specifying register 5, the data output signal S14 output from the tag memory 2 and the address output signal 20 output from the flip-flop circuit 4 are received, and it is judged whether or not an address designated by the data output signal S14 and the address output signal 20 corresponds to one of the invalidating addresses of the main memory. A judging result is sent to the memory access control unit 1 as a control signal S21.

Next, the relation between the caching addresses of the caching areas of the main memory and the addresses of the data blocks of the data memory 3 and the relation between the caching addresses of the caching areas of the main memory and the addresses of the tag memory 2 will be described below. In this embodiment, the caching is performed according to the direct mapping.

In a case where pieces of data of the caching areas of the main memory are stored in a plurality of data blocks of the data memory 3 as pieces of cached data, each caching address of the main memory is composed of upper bits, intermediate bits and lower bits.

In a case where data of the caching area of each caching address of the main memory is stored in a data block of the data memory 3, the upper bits of the caching address of the main memory are stored as the tag address in one tag block of the tag memory 2 corresponding to the caching area of the main memory. The intermediate bits of the caching address of the main memory indicate both an address of the corresponding data block of the data memory 3 and an address of the corresponding tag block of the tag memory 2. The intermediate bits are called an index address. Lower bits of each caching address of the main memory have no relation to the access to the tag memory 2. Therefore, the description of the lower bits is omitted.

In a case where it is desired to store data of one caching address of the main memory in the corresponding data block of the data memory 3, this data storing operation is performed by sending the index address from the CPU 100 to the data memory 3 to specify the corresponding area of the data memory 3. Also, in a case where the invalidating processing or the copy-back processing is performed in the cache memory, the index addresses specifying all tag blocks of the tag memory 2 and all data blocks of the data memory 3 are automatically produced in the memory access control unit 1 in response to a request of the CPU 100. Also, in a case where it is desired to store tag information in a tag block of the tag memory 2, the tag information sent from the CPU 100 is stored in the tag block of the tag memory 2.

Therefore, each caching address of the main memory corresponding to one data block of the data memory 3 can be specified by using the index address (derived from the intermediate bits of the caching address of the main memory) of the tag memory 2 and the tag address (derived from the upper bits of the caching address of the main memory) stored in the index address of the tag memory 2. The number of upper bits, the number of intermediate bits and the number of lower bits depend on the configuration of the cache memory, the memory capacity of the cache memory and the mapping method (the direct mapping or the set associative).

Next, an operation of the cache memory will be described below.

Figure 2:
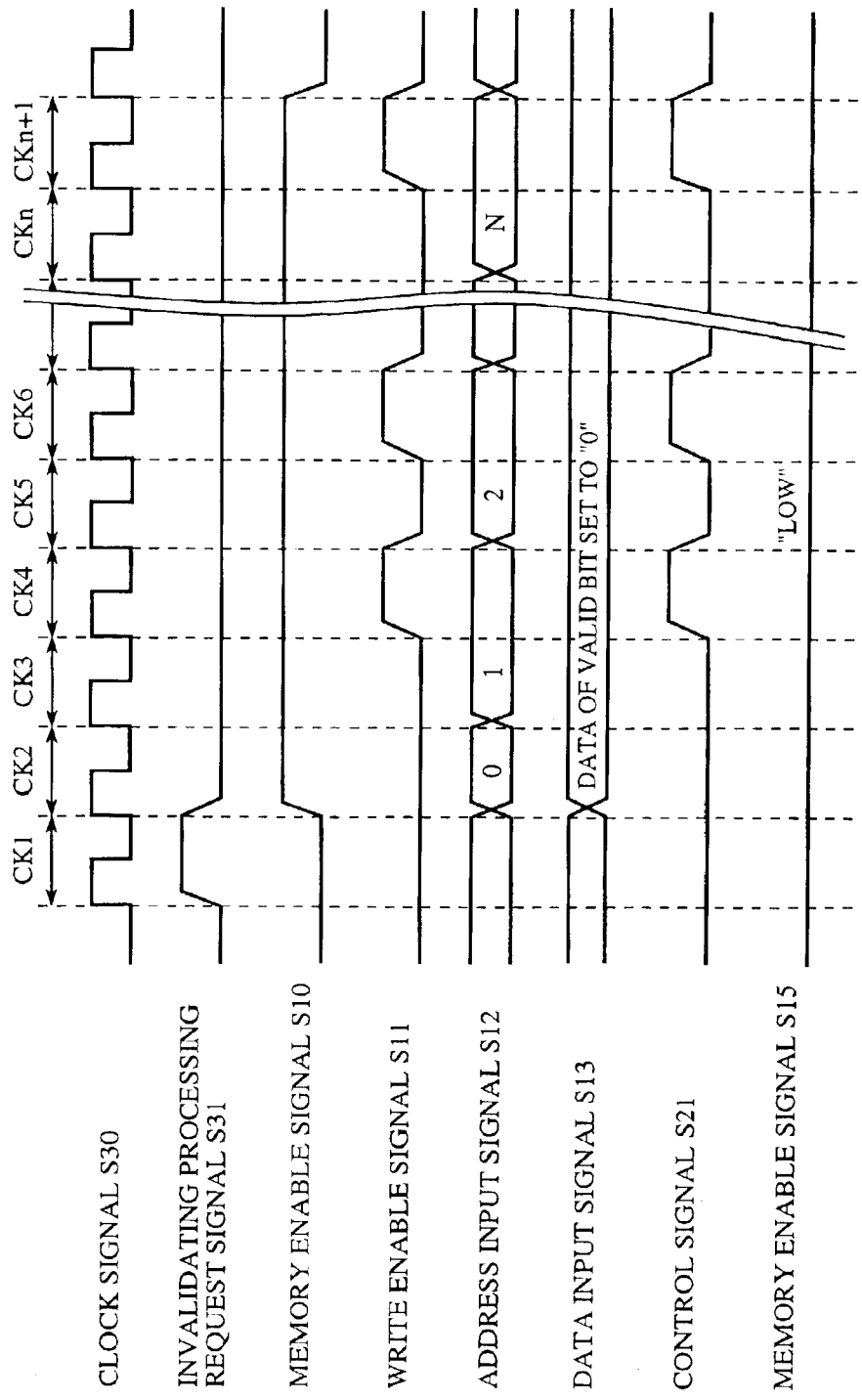
FIG. 2 is a timing chart of the invalidating processing performed for a data memory denoting a cache memory according to the first embodiment.

FIG. 2 is a timing chart of the invalidating processing performed for the data memory 3 denoting a cache memory according to the first embodiment.

A invalidating processing request signal S31 indicates a request of the CPU 100 sent to the memory access control unit 1 to perform the invalidating processing.

In a case where the memory enable signal S10 set to a high level and the write enable signal S11 set to a high level are output from the memory access control unit 1 to the tag memory 2, the write access to the tag memory 2 is performed in synchronization with a clock signal S30. Also, in a case where the memory enable signal S10 set to the high level and the write enable signal S11 set to a low level are output from the memory access control unit 1 to the tag memory 2, the read access to the tag memory 2 is performed in synchronization with the clock signal S30.

When the CPU 100 recognizes that the in validation of pieces of cached data stored in invalidating data blocks of the data memory 3 corresponding to the invalidating areas of the main memory is needed, the invalidating processing request signal S31 set to a high level is sent from the CPU 100 to the memory access control unit 1 according to a software (or a program) executed in the CPU 100 in a clock cycle CK1. Also, both a start address and an ending address of the invalidating areas of the main memory are stored in the area specifying register 5 by the CPU 100.

In the memory access control unit 1, in response to a trailing edge of the invalidating processing request signal S31 of the high level, a memory enable signal S10 is set to a high level. Therefore, the invalidating processing is performed during an invalidating time period from a clock cycle CK2 to a clock cycle CKn+1. Also, in the clock cycle CK2, a write enable signal S11 is maintained to a low level, an address input signal S12 indicating a top address "0" of the tag memory 2 is automatically produced in the memory access control unit 1 and is sent to the tag memory 2. Here, the top address "0" denotes an index address. Thereafter, both a tag address and a valid bit stored in a tag address of the tag memory 2 specified by the index address is output from the tag memory 2 to the invalidation judging unit 6 as a data output signal S14. Here, the tag address indicates the upper bits of the caching address of the main memory corresponding to the index address of the tag memory 2.

In the invalidation judging unit 6, the data output signal S14 including the tag address and the valid bit and the address output signal S20 output from the flip-flop circuit 4 are received. The address output signal S20 indicates the index address. Though the processing from the reception of the address input signal S12 to the outputting of the data output signal S14 is performed in the tag memory 2 in one clock cycle, because the index address delayed by one clock cycle is output from the flip-flop circuit 4, both the index address and the tag address are simultaneously received in the invalidation judging unit 6.

Thereafter, in the invalidation judging unit 6, a combined address is produced by combining the tag address and the index address in that order. The combined address indicates the caching address of the main memory corresponding to the index address of the data block of the data memory 3. Thereafter, it is judged in the invalidation judging unit 6 whether or not the combined address is placed within the invalidating areas of the main memory specified by the area information of the area specifying register 5. In other words, it is judged in the invalidation judging unit 6 whether or not the combined address agrees with one of the invalidating addresses of the main memory specified by the area information of the area specifying register 5.

In a case where a first judgment indicates that the combined address agrees with one of the invalidating addresses, it is judged in the invalidation judging unit 6 whether or not the valid bit of the data output signal S14 is set to "1" (or a valid state). In a case where a second judgment indicates that the valid bit is set to "1", it is needed to invalidate cached data of the data block of the data memory 3 indicated by the index address. Therefore, a control signal S21 set to a high level is sent from the invalidation judging unit 6 to the memory access control unit 1.

Also, in a case where a first judgment indicates that the combined address is not equal to any of the invalidating addresses, it is not needed to invalidate cached data of the data block of the data memory 3 indicated by the index address. Therefore, a control signal S21 set to a low level is sent from the invalidation judging unit 6 to the memory access control unit 1. Also, even though the first judgment indicates that the combined address agrees with one of the invalidating addresses, in a case where a second judgment indicates that the valid bit is set to "0", it is not needed to invalidate cached data of the data block of the data memory 3 indicated by the index address. Therefore, a control signal S21 set to a low level is sent from the invalidation judging unit 6 to the memory access control unit 1.

In the example shown in FIG. 2, because the combined address obtained from the top address "0" does not agree with any of the invalidating addresses, it is not needed to invalidate cached data of the data block of the data memory 3 indicated by the top address "0", the control signal S21 set to the low level is sent from the invalidation judging unit 6 to the memory access control unit 1.

In the memory access control unit 1, in response to the control signal S21 of the low level, the index address indicated by the address input signal S12 is incremented, and an address input signal S12 indicating a second address "1" as an index address is sent to the tag memory 2 in a next clock cycle CK3.

Thereafter, in the same manner, the first judgment and the second judgment are performed in the invalidation judging unit 6. Because the combined address obtained from the second address "1" agrees with one of the invalidating addresses, it is needed to invalidate cached data of the data block of the data memory 3 indicated by the second address "1", a control signal S21 set to the high level is sent from the invalidation judging unit 6 to the memory access control unit 1.

In the memory access control unit 1, in response to the control signal S21 of the high level, in a next clock cycle CK4, the write enable signal S11 is set to the high level, the address input signal S12 indicating the same address (that is, the second address "1") is set, and the data input signal S13 indicating a valid bit set to "0" (invalid state) is set. Thereafter, the signals S11, S12 and S13 are sent to the tag memory 2. Therefore, the valid bit set to "0" is written in an area of the index address (that is, second address "1") of the tag memory 2.

Thereafter, the index address indicated by the address input signal S12 is incremented, an address input signal S12 indicating a next index address is sent to the tag memory 2 in a next clock cycle, and the invalidation of cache data stored in the next index address of the data memory 3 or no invalidation of the cache data is performed in the same manner. This invalidating processing is performed for all addresses of the tag memory 2 (or the data memory 3) ranging from the top address "0" to the final address "N", and the invalidating processing is completed.

As is described above, in the first embodiment, pieces of data of the main memory indicated by the caching addresses are stored in the data memory 3 as pieces of cache data, and the tag address produced from the upper bits of each caching address is stored in the corresponding tag block of the tag memory 2. In case of the invalidating processing, area information specifying the invalidating addresses of invalidating areas of the main memory relating to the invalidating processing is stored in the area specifying register 5, each of index addresses specifying all tag blocks of the tag memory 2 and all data blocks of the data memory 3 is produced in the memory access control unit 1, the index addresses are sent to the tag memory 2 and the data memory 3 one after another, the invalidation judging unit 6 refers to the area information specifying the invalidating addresses of the invalidating areas of the main memory, the combined address corresponding to one caching address of the main memory is obtained from each index address and the tag address of the corresponding tag block of the tag memory 2, the judgment result is obtained by judging whether or not the combined address agrees with one of the invalidating addresses, and the cached data of the data memory 3 indicated by the index address is invalidated in a case where the combined address agrees with one of the invalidating addresses.

Therefore, because the necessity of the invalidation is not checked for all areas of the main memory but is checked only for the data blocks indicated by the index addresses in response to only one request of the CPU 100, even though a memory size of the main memory corresponding to the invalidating processing is considerably larger than a memory size of the cache memory, the processing time required to perform the invalidating processing can be reduced. For example, in a case where the invalidating processing for both an invalidating area size of 1 MB of the main memory and the cache memory having a memory size of 1 KB is needed, the scanning is performed only for the addresses of the cache memory. Therefore, it is not required to gain access to the cache memory for each address of the invalidating area of the main memory, and the processing time required to perform the invalidating processing can be reduced.

Also, because the invalidating processing for all data blocks of the conventional cache memory is performed, even though the invalidating processing for one data block is not needed, cached data of the data block is unnecessarily invalidated. In contrast, in the present invention, the cached data of the data block of the data memory 3 is invalidated in a case where the combined address obtained from the index address and the tag address of the data block agrees with one of the invalidating addresses. Therefore, the efficiency in the use of the cache memory can be heightened.

In the first embodiment, the invalidating processing for the cache memory operated according to the direct mapping is described. However, it is applicable that the invalidating processing be performed for the cache memory operated according to the set associative. In this case, the tag memory 2, the data memory 3 and the invalidation judging unit 6 are prepared for each of a plurality of cache ways, and the invalidating processing can be performed in the same manner as in the first embodiment.

Embodiment 2

Figure 3:
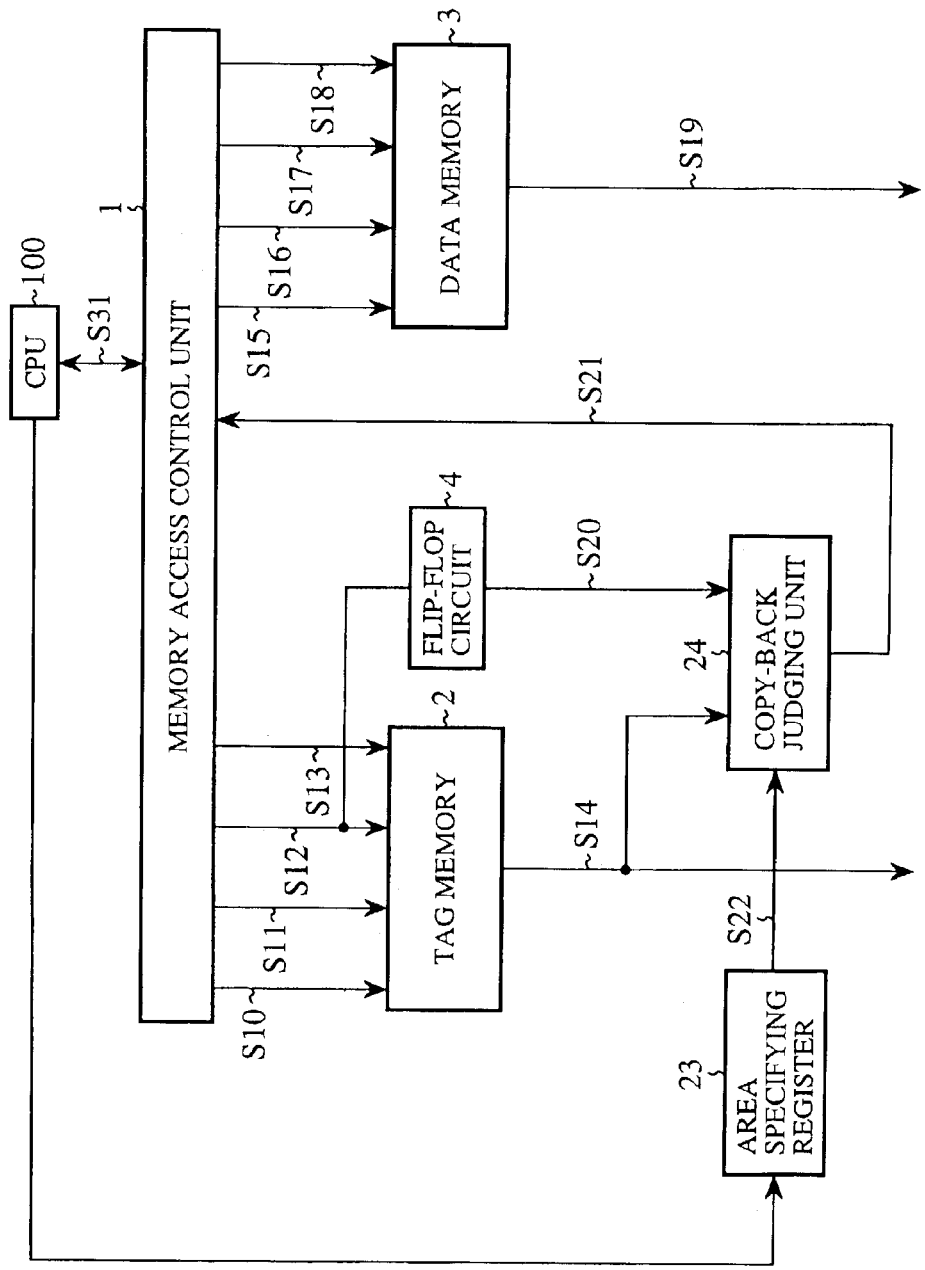
FIG. 3 is a block diagram of a cache memory according to a second embodiment of the present invention.

FIG. 3 is a block diagram of a cache memory according to a second embodiment of the present invention. The constituent elements, which are the same as those shown in FIG. 1, are indicated by the same reference numerals as those of the constituent elements shown in FIG. 1, and additional description of those constituent elements is omitted.

In FIG. 3, a cache memory comprises the memory access control unit 1, the tag memory 2, the data memory 3, the flip-flop 4, an area specifying register 23 and a copy-back judging unit (or a judging unit) 24.

The relation between addresses of a plurality of areas (or data blocks) of a main memory (not shown) and addresses of a plurality of data blocks of the data memory 3 and the relation between the addresses of the areas of the main memory and addresses of a plurality of tag blocks of the tag memory 2 are set according to the direct mapping in the same manner as in the first embodiment.

The addresses of the main memory are allocated to the areas of the main memory, and the main memory includes a plurality of caching addresses. Pieces of data of a plurality of caching areas of the main memory indicated by the caching addresses are stored in the data blocks of the data memory 3 as pieces of cached data. In a case where the CPU 100 judges that the copy-back processing for pieces of data stored in a plurality of copy-back data blocks of the data memory 3 is needed to write back the pieces of data of the copy-back data blocks of the data memory 3 to a plurality of writing-back areas of the main memory indicated by a plurality of writing-back addresses, information specifying the writing-back addresses of the main memory is stored in the area specifying register 23 by the CPU 100. The writing-back addresses of the main memory are included in the caching addresses of the main memory.

The area specifying register 23 has two registers. A start address of the writing-back areas of the main memory is stored in one register, and an ending address of the writing-back areas of the main memory or the number of writing-back areas of the main memory is stored in the other register. In a case where the CPU 100 recognizes that the copy-back processing is needed, both the start address of the writing-back areas of the main memory and the ending address of the writing-back areas of the main memory or the number of writing-back areas of the main memory are stored in the area specifying register 5 under the control of the CPU 100.

In the copy-back judging unit 24, an address information output signal S22 output from the area specifying register 23, the data output signal S14 output from the tag memory 2 and the address output signal 20 output from the flip-flop circuit 4 are received, and it is judged whether or not an address of a data block of the data memory 3 designated by the address output signal S20 corresponds to one of the writing-back addresses of the main memory. A judging result is sent to the memory access control unit 1 as a control signal S21.

Next, an operation of the cache memory will be described below.

Figure 4:
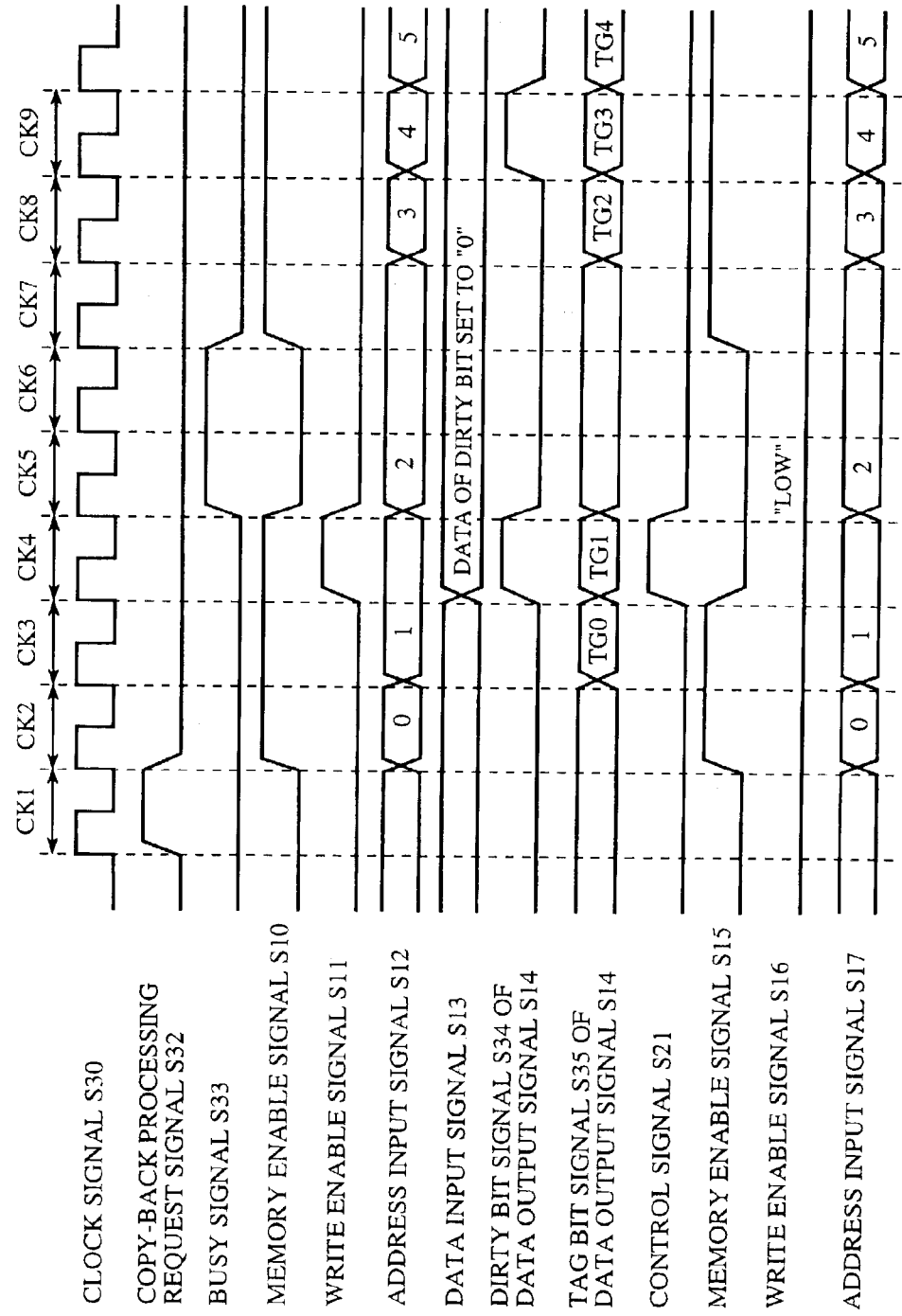
FIG. 4 is a timing chart of the copy-back processing performed for a main memory and a data memory denoting a cache memory according to the second embodiment.

FIG. 4 is a timing chart of the copy-back processing performed for the main memory and the data memory 3 denoting a cache memory according to the second embodiment.

A copy-back processing request signal S32 indicates a request of the CPU 100 sent to the memory access control unit 1 to perform the copy-back processing. A leading edge of a busy signal 33 set to a high level indicates that the writing-back of data of one data block of the data memory 3 to the main memory is started, and a trailing edged of the busy signal 33 set to a low level indicates that the writing-back of data of one data block of the data memory 3 to the main memory is completed. The busy signal 33 is sent from the CPU 100 to the memory access control unit 1 to temporarily stop the read access performed by the memory access control unit 1.

A dirty bit signal S34 indicating the dirty bit of the tag information is included in the data output signal S14. In a case where data different from that of the main memory is written in a data block of the data memory 3 under control of the CPU 100, because the data of the data block of the data memory 3 differs from that of the corresponding area of the main memory, the writing-back of the data to the corresponding area of the main memory is needed. Therefore, the dirty bit of the tag information of the corresponding tag block of the tag memory 2 is set to the high level by the CPU 100.

A tag bit signal S35 indicating the tag address of the tag information is included in the data output signal S14.

In a case where the memory enable signal S10 set to a high level and the write enable signal S11 set to a high level are output from the memory access control unit 1 to the tag memory 2, the write access to the tag memory 2 is performed in synchronization with a clock signal S30. Also, in a case where the memory enable signal S10 set to the high level and the write enable signal S11 set to a low level are output from the memory access control unit 1 to the tag memory 2, the read access to the tag memory 2 is performed in synchronization with the clock signal S30.

When the CPU 100 recognizes that the copy-back processing for pieces of data stored in the copy-back data blocks of the data memory 3 corresponding to the writing-back areas of the main memory is needed, the copy-back processing request signal S32 set to a high level is sent from the CPU 100 to the memory access control unit 1 according to a software (or a program) executed in the CPU 100 in a clock cycle CK1. Also, area information specifying both a start address and an ending address of the writing-back areas of the main memory are stored in the area specifying register 23 by the CPU 100.

In the memory access control unit 1, in response to a trailing edge of the copy-back processing request signal S32 of the high level, the write enable signal S16 maintained to the low level and the memory enable signal S15 set to a high level are output to the data memory 3 to perform the read access to the data memory 3 in synchronization with a clock signal S30. Also, the memory enable signal S10 set to the high level and the write enable signal S11 set to the low level are output to the tag memory 2 to perform the read access to the tag memory 2 in synchronization with the clock signal S30. Therefore, the memory access control unit 1 can gain access to the tag memory 2 and the data memory 3. Also, the address input signal S12 indicating a top address "0" of the tag memory 2 and the address input signal S17 indicating a top address "0" of the data memory 3 are sent to the tag memory 2 and the data memory 3 respectively. Here, the top address "0" denotes an index address as described in the first embodiment.

Thereafter, a tag address indicated by a tag bit signal S35, a valid bit and a dirty bit signal S34 are output from the tag block of the index address of the tag memory 2 to the copy-back judging unit 24 as a data output signal S14. Here, the tag address indicates the upper bits of the caching address of the main memory corresponding to the index address of the tag memory 2. Also, data of the data block of the index address of the data memory 3 is output to the CPU 100 as a data output signal S19. In FIG. 4, TG0 indicates the top address "0" of the tag bit signal S35, and TG1 indicates the second address "1" of the tag bit signal S35.

In the copy-back judging unit 24, the data output signal S14 including the tag address, the valid bit and the dirty bit and the address output signal S20 output from the flip-flop circuit 4 are received. The address output signal S20 indicates the index address. Though the processing from the reception of the address input signal S12 to the outputting of the data output signal S14 is performed in the tag memory 2 in one clock cycle, because the index address delayed by one clock cycle is output from the flip-flop circuit 4, both the index address and the tag address are simultaneously received in the copy-back judging unit 24. For example, the tag address "TG0" of the tag bit signal S35 and the index address "0" of the address input signal S12 are simultaneously received in the copy-back judging unit 24.

Thereafter, in the copy-back judging unit 24, a combined address is produced by combining the tag address and the index address in that order. The combined address indicates the caching address of the main memory corresponding to the index address of the data block of the data memory 3. Thereafter, it is judged in the copy-back judging unit 24 whether or not the combined address is placed within the writing-back areas of the main memory specified by the area information of the area specifying register 23. In other words, it is judged in the copy-back judging unit 24 whether or not the combined address agrees with one of the writing-back addresses of the main memory specified by the area information of the area specifying register 23.

In a case where a first judgment indicates that the combined address agrees with one of the writing-back addresses, it is judged in the copy-back judging unit 24 whether or not the valid bit of the data output signal S14 is set to "1" (or a valid state). In a case where a second judgment indicates that the valid bit is set to "1", it is judged in the copy-back judging unit 24 whether or not the dirty bit of the data output signal S14 is set to "1" to indicate the necessity of the writing-back of data to the main memory. In a case where a third judgment indicates that the dirty bit of the data output signal S14 is set to "1", the copy-back judging unit 24 judges that the writing-back of the data of the corresponding data block of the data memory 3 to the main memory is needed. Therefore, a control signal S21 set to a high level is sent from the copy-back judging unit 24 to the memory access control unit 1 and the CPU 100.

Also, in a case where a first judgment indicates that the combined address does not agree with any of the writing-back addresses, this first judgment denotes no necessity of the writing-back of data to the main memory. Therefore, a control signal S21 set to a low level is sent from the copy-back judging unit 24 to the memory access control unit 1 and the CPU 100. Also, even though the first judgment indicates that the combined address agrees with one of the writing-back addresses, in a case where a second judgment indicates that the valid bit is set to "0", because the data of the corresponding data block of the data memory 3 is invalid, it is not needed to write back the data to the main memory. Therefore, a control signal S21 set to a low level is sent from the copy-back judging unit 24 to the memory access control unit 1 and the CPU 100. Also, even though the first judgment and the second judgment indicate the performance of the writing-back of data to the main memory, in a case where a third judgment indicates that the dirty bit is set to "0", it is not needed to write back the data to the main memory. Therefore, a control signal S21 set to a low level is sent from the copy-back judging unit 24 to the memory access control unit 1 and the CPU 100.

In a case where the control signal S21 set to the high level is received in the memory access control unit 1 and the CPU 100, in the memory access control unit 1, the write enable signal S11 is set to the high level by one clock cycle to perform the write access to the tag memory 2, the address input signals S12 and S17 indicating the same index address are again set by one clock cycle, and the data input signal S13 indicating a dirty bit set to "0" is set. Thereafter, the signals S11, S12 and S13 are sent to the tag memory 2, and the dirty bit set to "0" is written in the tag block of the tag memory 2 corresponding to the index address of the address input signal S12. The reason that the dirty bit set to "0" is written in the tag block of the tag memory 2 is as follows. Because it is planned in succeeding clock cycles to write back the data to the main memory, it is not needed to maintain the dirty bit of the tag block of the tag memory 2 to "1".

The writing-back of the data to the main memory is performed under control of the CPU 100 in succeeding clock cycles. In detail, the data output signal S19 output from the data memory 3 is sent to the corresponding cashing address of the main memory, and the data indicated by the data output signal S19 is written in the corresponding area of the corresponding cashing address. During the writing-back of the data to the main memory, the busy signal S33 is set to the high level, and the memory enable signals S10 and S15 set to the low level are output from the memory access control unit 1 to the tag memory 2 and the data memory 3 to prohibit the read access and the write access to the tag memory 2 and the data memory 3. In this case, though the index address of the address input signals S12 and S17 is changed in the memory access control unit 1 to a next index address in synchronization with a leading edge of the busy signal S33 of the high level, the change of the address input signals S12 and S17 is stopped during the busy signal S33 of the high level and a following one clock cycle of the busy signal S33 of the low level.

When the writing-back of the data to the main memory is completed, the busy signal S33 is set to the low level by the CPU 100, the memory enable signals S10 and S15 set to the high level are output from the memory access control unit 1 to the tag memory 2 and the data memory 3 to restart the read access to the tag memory 2 and the data memory 3, and the processing is performed in the same manner to judge the necessity of the writing-back of the changed index address indicated by the address input signals S12 and S17.

In a case where the control signal S21 set to the low level is received in the memory access control unit 1 and the CPU 100, the index address of the address input signals S12 and S17 is changed in the memory access control unit 1 to a next index address, and none of the other signals is changed in the memory access control unit 1. Also, no writing-back of the data is performed by the CPU 100. Thereafter, the processing is performed to judge the necessity of the writing-back of the changed index address indicated by the address input signals S12 and S17.

In a case where the processing for the final index address is completed, the copy-back processing is completed.

In the example shown in FIG. 4, the writing-back of data of the top address "0" to the main memory is not needed in a clock cycle CK2, the writing-back of data of the second address "1" to the main memory is needed in a clock cycle CK3, the dirty bit set to "0" is written in the tag information of the second address "1" of the tag memory 2 in a clock cycle CK4, the writing-back of data of the second address "1" of the data memory 2 to the main memory is performed in clock cycles CK5 and CK6, the writing-back of data of the third address "2" of the data memory 2 to the main memory is not needed in a clock cycle CK8, and the writing-back of data of the fourth address "3" of the data memory 2 to the main memory is not needed in a clock cycle CK9.

As is described above, in the second embodiment, pieces of data of the main memory indicated by the caching addresses are stored in the data memory 3 as pieces of cache data, and the tag address produced from the upper bits of each caching address is stored in the corresponding tag block of the tag memory 2. In case of the copy-back processing, area information specifying the copy-back addresses of writing-back areas of the main memory relating to the copy-back processing is stored in the area specifying register 5, each of index addresses specifying all tag blocks of the tag memory 2 and all data blocks of the data memory 3 is produced in the memory access control unit 1, the index addresses are sent to the tag memory 2 and the data memory 3 one after another, the copy-back judging unit 24 refers to the area information specifying the writing-back addresses of the writing-back areas of the main memory, the combined address agreeing with one caching address of the main memory is obtained from each index address and the tag address of the tag block of the tag memory 2 corresponding to the caching address of the main memory, the judgment result is obtained by judging whether or not the combined address agrees with one of the writing-back addresses, and the data of the data memory 3 indicated by the index address is written back to the corresponding data block of the main memory in a case where the combined address agrees with one of the writing-back addresses.

Therefore, because the necessity of the writing-back of data to the main memory is not checked for all writing-back areas of the main memory but is checked only for all areas of the cache memory in response to only one request of the CPU 100, even though a memory size of the main memory is considerably larger than a writing-back area size of the cache memory, the processing time required to perform the copy-back processing can be reduced. For example, in a case where the copy-back processing for both a writing-back area size of 1 MB of the main memory and the cache memory having a memory size of 1 KB is needed, the scanning is performed only for the addresses of the cache memory. Therefore, it is not required to gain access to the cache memory for each address of the writing-back area of the main memory, and the processing time required to perform the copy-back processing can be reduced.

Also, because the copy-back processing for all data blocks of the conventional cache memory is performed by checking the valid bit and the dirty bit of each tag block of the tag memory 2, even though the copy-back processing for one data block is not needed, cached data of the data block is unnecessarily written back to the main memory. In contrast, in the second embodiment, because data of a data block of the data memory 3 is written back to the main memory in a case where the combined address corresponding to the data block agrees with one of the writing-back addresses, the efficiency in the use of the cache memory can be heightened.

In the second embodiment, the copy-back processing for the cache memory operated according to the direct mapping is described. However, it is applicable that the copy-back processing be performed for the cache memory operated according to the set associative. In this case, the tag memory 2, the data memory 3 and the invalidation judging unit 6 are prepared for each of a plurality of cache ways, and the copy-back processing can be performed in the same manner as in the second embodiment.

Embodiment 3

Figure 5:
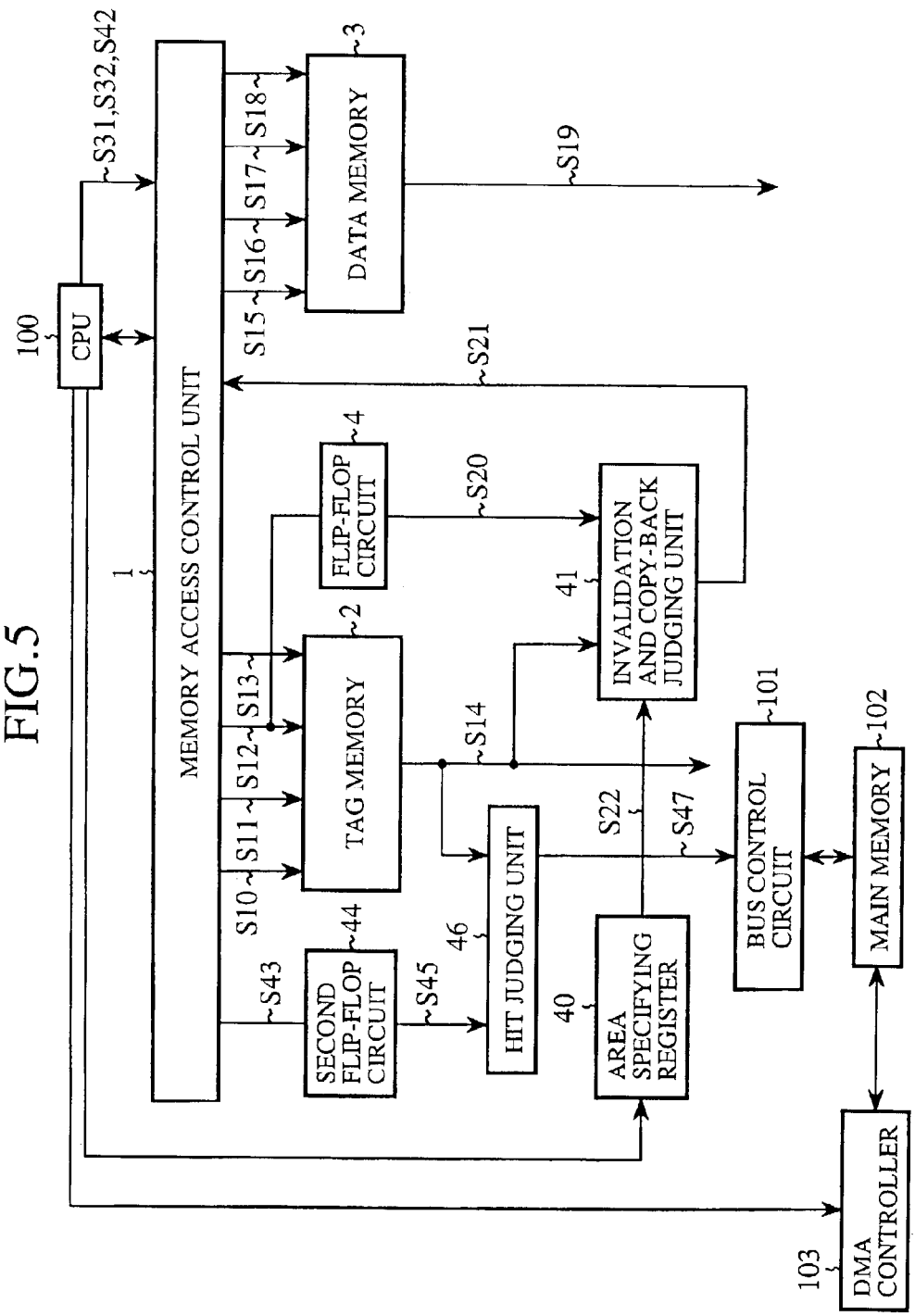
FIG. 5 is a block diagram of a cache memory according to a third embodiment of the present invention.

FIG. 5 is a block diagram of a cache memory according to a third embodiment of the present invention. The constituent elements, which are the same as those shown in FIG. 1, are indicated by the same reference numerals as those of the constituent elements shown in FIG. 1, and additional description of those constituent elements is omitted.

As shown in FIG. 5, a cache memory comprises the memory access control unit 1, the tag memory 2, the data memory 3, the flip-flop circuit 4, an area specifying register (or an area specifying unit) 40 having both the function of the area specifying register 5 and the function of the area specifying register 23, an invalidation and copy-back judging unit (or a judging unit) 41 having both the function of the invalidation judging unit 6 and the function of the copy-back judging unit 24, a second flip-flop 44, and a hit judging unit 46. Also, the CPU 100, a DMA controller 103, a main memory 102 and a bus control circuit 101 are used for the DMA transfer performed in cooperation with the cache memory.

The relation between addresses of a plurality of areas of the main memory 102 and addresses of a plurality of data blocks of the data memory 3 and the relation between the addresses of the areas of the main memory 102 and addresses of a plurality of tag blocks of the tag memory 2 are set according to the direct mapping in the same manner as in the first embodiment.

In the area specifying register 40, in a case where the invalidating processing or the copy-back processing is needed in the cache memory, area information specifying the invalidating areas of the invalidating addresses of the main memory 102 or the writing-back areas of the writing-back addresses of the main memory 102 is received from the CPU 100 and is stored. The area specifying register 40 has two registers. A start address of the invalidating areas or the writing-back areas of the main memory 102 is stored in one register, and an ending address of the invalidating areas or the writing-back areas of the main memory 102 is stored in the other register. In this case, it is applicable that the number of invalidating areas or writing-back areas of the main memory 102 be stored in the other register in place of the ending address to perform the invalidating processing or the copy-back processing. In a case where the CPU 100 recognizes that the invalidating processing is needed, both the start address of the invalidating areas of the main memory 102 and the ending address of the invalidating areas of the main memory 102 or the number of invalidating areas of the main memory 102 are stored in the area specifying register 40 under the control of the CPU 100. Also, in a case where the CPU 100 recognizes that the copy-back processing is needed, both the start address of the writing-back areas of the main memory 102 and the ending address of the writing-back areas of the main memory 102 or the number of writing-back areas of the main memory 102 are stored in the area specifying register 40 under the control of the CPU 100.

In the tag memory 2, the tag information including the tag address, the valid bit and the dirty bit is stored in each tag block in the same manner as in the first and second embodiments.

In the invalidation and copy-back judging unit 41, the address information output signal S22 output from the area specifying register 40, the data output signal S14 output from the tag memory 2 and the address output signal 20 output from the flip-flop circuit 4 are received, and it is judged whether or not the index address of the data memory 3 designated by the address output signal 20 corresponds to one of the invalidating addresses of the main memory 102 or corresponds to one of the writing-back addresses of the main memory 102. A judging result is sent to the memory access control unit 1 as a control signal S21.

A lock control signal S42 is sent from the CPU 100 to the memory access control unit 1 to prevent the writing of data of the main memory 102 to the cache memory.

In a case where the CPU 100 gains access to the cache memory to write data to one data block of the data memory 3 or to read out data from one data block of the data memory 3, an address of one area of the main memory 102 corresponding to the address of the data block of the data memory 3 is sent as an access address from the CPU 100 to the memory access control unit 1. The access address is composed of upper bits, intermediate bits and lower bits. The intermediate bits indicates an index address which is the same as the address of the data block of the data memory 3. In the memory access control unit 1, the upper bits of the access address is extracted from the access address as a tag address, and an index address indicated by the intermediate bits of the access address is extracted from the access address.

In the second flip-flop circuit 44, a tag address signal S43 indicating the extracted tag address is received from the memory access control unit 1, and the tag address signal S43 delayed by one clock cycle is output as an address output signal S45.

In the hit judging unit 46, the address output signal S45 output from the second flip-flop circuit 44 and the data output signal S14 of the tag memory 2 are received, the extracted tag address of the address output signal S45 is compared with the tag address of the data output signal S14, and it is judged whether the access of the CPU 100 to the cache memory is successfully performed. In a case where data of one area of the main memory 102 is cached in the data block of the index address of the data memory 3, the extracted tag address of the address output signal S45 agrees with the tag address of the data output signal S14, and the access of the CPU 100 to the cache memory is successfully performed. Therefore, the hit judging unit 46 judges to be a cache hit. In contrast, in a case where no data of the main memory 102 is cached in the data block of the index address of the data memory 3, the extracted tag address of the address output signal S45 differs from the tag address of the data output signal S14, and the access of the CPU 100 to the cache memory is not successfully performed. Therefore, the hit judging unit 46 judges to be a cache miss. A judging result is output to the bus control circuit 101 as a hit judging signal S47.

Next, an operation of the cache memory will be described below.

In the memory access control unit 1, when an access address is received from the CPU 100, an index address denoting intermediate bits of the access address is extracted from the access address, the index address is sent to the tag memory 2 as an address input signal S12 to specify a specific tag block of the index address, and the index address is sent to the data memory 3 as an address input signal S17 to specify a specific data block of the index address. Also, a tag address denoting upper bits of the access address is extracted from the access address, and the tag address is sent to the flip-flop circuit 44 as a tag address signal S43.

In the tag memory 2, tag information stored at the specific tag block of the index address is output as a data output signal S14 and is sent to both the hit judging unit 46 and the invalidation and copy-back judging unit 41. The tag information includes a tag address, a valid bit and a dirty bit. As is described in the first embodiment, in a case where data of a specific area of the main memory 102 indicated by the access address is cached in the specific data block of the index address of the data memory 3, the tag address of the tag information denotes the upper bits of the access address of the specific area of the main memory 102.

In the hit judging unit 46, the tag address delayed by one clock cycle in the flip-flop circuit 44 is received as an data output signal S45, and the tag address of the data output signal S14 is received. Therefore, though the processing from the reception of the address input signal S12 to the outputting of the data output signal S14 is performed in the tag memory 2 in one clock cycle, both the data output signal S45 denoting the extracted tag address and the data output signal S14 denoting the tag address are simultaneously received in the hit judging unit 46. Thereafter, in the hit judging unit 46, it is judged whether or not the extracted tag address of the data output signal S45 agrees with the tag address of the data output signal S14. In a case where both the tag addresses agree with each other, the hit judging unit 46 judges to be a cache hit. In a case where both the tag addresses differ from each other, the hit judging unit 46 judges to be a cache miss. The judging result of the cache hit or the cache miss is informed of the bus control circuit 101.

In case of the cache hit, information of the cache hit is sent to the bus control circuit 101, data output from the data memory 3 in response to the address input signal S17 is sent to the CPU 100 under control of the bus control circuit 101 and is used by the CPU 100. In contrast, in case of the cache miss, information of the cache miss is sent to the bus control circuit 101, a bus line from the specific area of the main memory 102 to the specific data block of the data memory 3 is set under control of the bus control circuit 101, a cache replacement is performed under control of the CPU 100 to write the data of the specific area of the main memory 102 to the specific data block of the data memory 3, and the rewritten data of the specific data block of the data memory 3 is used by the CPU 100.

Also, the invalidating processing is performed in the cache memory in the same manner as in the first embodiment. In this case, the area specifying register 40 functions as the area specifying register 5, and the invalidation and copy-back judging unit 41 functions as the invalidation judging unit 6.

Also, the copy-back processing is performed in the cache memory in the same manner as in the second embodiment. In this case, the area specifying register 40 functions as the area specifying register 23, and the invalidation and copy-back judging unit 41 functions as the copy-back judging unit 24.

Also, in a case where the DMA controller 103 intends to gain access to a transferring area or a plurality of transferring areas of the main memory 102 to perform a DMA transfer, the invalidating processing and/or the copy-back processing are first performed, and the DMA transfer is secondly performed for the data blocks of the data memory 3 corresponding to the transferring areas of the main memory 102. The DMA transfer is performed through the DMA controller 103 according to a software executed in the CPU 100. For example, as the reading operation for the main memory 102, the data transfer from the main memory 102 to another memory (not shown) except for the cache memory is performed. As the write operation for the main memory 102, the data transfer from a memory (not shown) except for the cache memory to the main memory 102 is performed.

In a case where the DMA transfer is performed to read out pieces of data of the transferring areas of the main memory 102, the copy-back processing is performed for the data memory 3 to write updated data of the data memory 3 to the main memory 102. Thereafter, the pieces of updated data of the transferring areas of the main memory 102 are read out in the DMA transfer. Also, in a case where the DMA transfer is performed to write pieces of updated data to the transferring areas of the main memory 102, the copy-back processing is performed for the data memory 3 to write updated data of copy-back data blocks of the data memory 3 to the main memory 102, and the invalidating processing is performed for invalidating data blocks of the data memory 3 differing from the transferring data blocks to keep the coherency between the main memory 102 and the data memory 3 after the DMA transfer. Thereafter, the write transfer is performed under the control of the DMA controller 103.

To heighten the probability of the cache hit, one entry size of the cache memory is larger than a minimum unit of the access performed by either the CPU 100 or a bus master of the DMA controller 103. Therefore, there is a case where a transferring area (or a part of a transferring area) and a non-transferring area of the main memory 102 are adjacent to and correspond to one data block of the data memory 3 and the CPU 100 gains access to the non-transferring area of the main memory 102 before the DMA transfer is performed for the transferring area of the main memory 102. In this case, a part of the old data, which is stored in the transferring area of the main memory 102 and is included in the same data block as the data of the non-transferring area, is undesirably written to the corresponding data block of the data memory 3 in the cache replacement. As a result, a problem has arisen that the coherency between the data memory 3 and the main memory 102 cannot be maintained.

To solve this problem, after the copy-back processing and/or the invalidating processing are performed for all data blocks of the data memory 3, the cache memory is set in an off-state during the DMA transfer, and the cache memory is set in an on-state after the completion of the DMA transfer. However, in this method, the performance of the data memory 3 is undesirably degraded, and the efficiency in the use of the cache memory is undesirably lowered.

Also, to solve this problem, the transferring areas of the main memory 102 are separated from the other valid areas of the main memory 102 according to a software architecture to prevent that data of one transferring area and data of one non-transferring valid area of the main memory 102 are simultaneously written to data blocks of the data memory 3. However, in this method, the developing cost of the software architecture is increased to modify an existing software architecture to another software architecture suitable for this method.

Therefore, in the third embodiment, to solve this problem, a lock function is added to the cache memory having the functions of the invalidating processing and the copy-back processing, and the lock function is combined with the functions of the invalidating processing and the copy-back processing. Here, the lock function denotes a function for preventing the cache replacement from being performed in case of the cache miss. In other words, even though the CPU 100 performs the cache miss, data of the main memory 102 is not written to the data memory 3.

The operation of the cache memory based on the lock function will be described with reference to FIG. 6.

Figure 6:
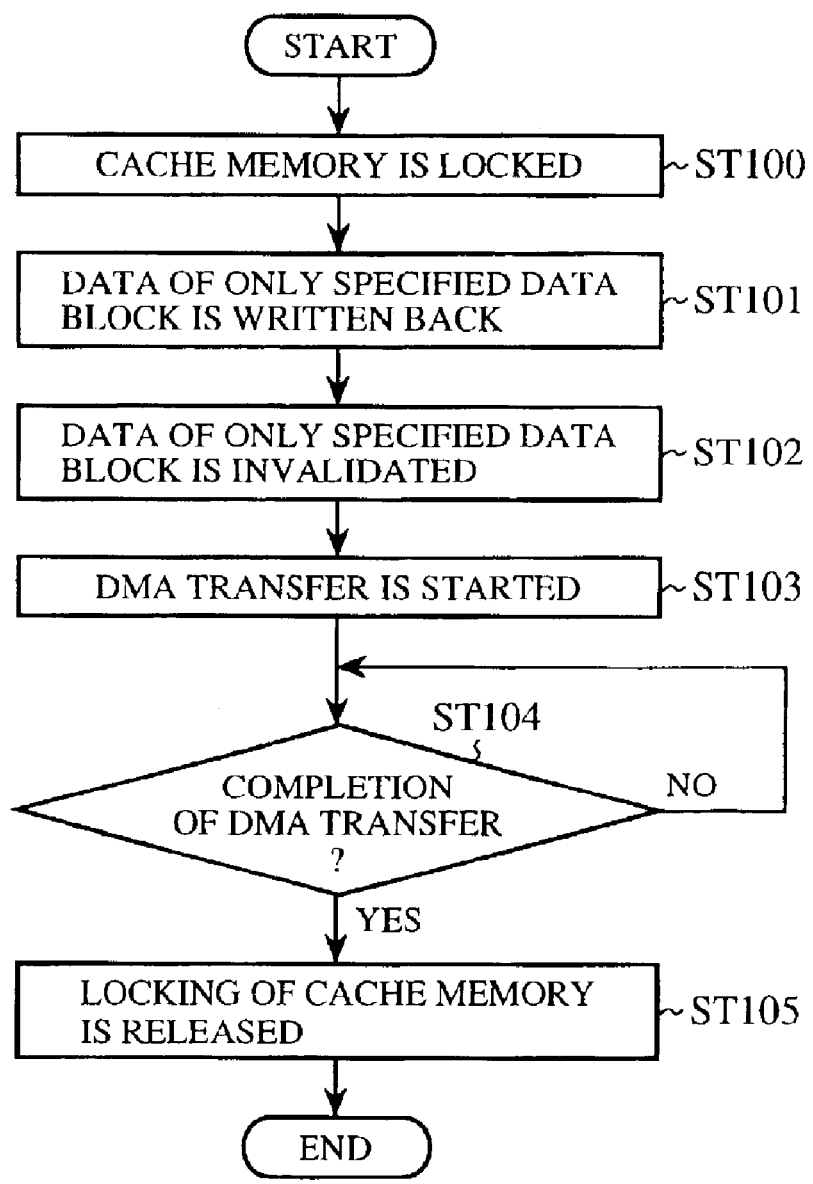
FIG. 6 is a flow chart showing the procedure of the write access to a main memory performed for a DMA transfer according to the third embodiment or a fourth embodiment of the present invention.

FIG. 6 is a flow chart showing the procedure of the write access to the main memory 102 performed for a DMA transfer according to the third embodiment or a fourth embodiment of the present invention.

In a case where the CPU 100 recognizes the necessity of a DMA transfer, a lock control signal set to a high level is sent from the CPU 100 to the memory access control unit 1, and the cache memory such as the data memory 3 is locked (step ST100). Therefore, the data writing operation from the main memory 102 to the cache memory in the cache replacement is prohibited.

Thereafter, information of the writing-back areas of the main memory 102, which include transferring areas of the main memory 102, is stored in the area specifying register 40. Thereafter, a copy-back processing request signal S32 is sent from the CPU 100 to the memory access control unit 1, and the copy-back processing is performed (step ST101).

After the copy-back processing is completed, an invalidating processing request signal S31 is sent from the CPU 100 to the memory access control unit 1, and the invalidating processing is performed (step ST102). At this time, the value of the area specifying register 40 is not changed because the writing-back areas are the same as invalidating areas.

After the invalidating processing is completed, a DMA transfer admissible request is sent from the CPU 100 to the DMA controller 103, the DMA transfer is started under control of the DMA controller 103 to write pieces of updated data to the transferring areas of the main memory 102 respectively (step ST103). Thereafter, the CPU 100 judges whether or not the DMA transfer is completed (step ST104). In a case where the CPU 100 judges that the DMA transfer is completed, the lock signal S42 set to a low level is sent from the CPU 100 to the memory access control unit 1, and the cache memory such as the data memory 3 is released from the lock state under control of the memory access control unit 1 (step ST105). Therefore, the cache memory is set to a normal state.

During the locking of the cache memory, even though a transferring area and a non-transferring area of the main memory 102 are adjacent to and correspond to a data block of the data memory 3 and the CPU 100 gains access to the non-transferring area, no cache replacement is performed. Therefore, old data of the transferring area of the main memory 102 is not written to the corresponding data block of the data memory 3. Accordingly, the coherency between the data memory 3 and the main memory 102 can be maintained.

In the third embodiment, the invalidating processing and the copy-back processing for the cache memory operated according to the direct mapping are described. However, it is applicable that the invalidating processing and the copy-back processing be performed for the data memory 3 operated according to the set associative. In this case, the tag memory 2, the data memory 3 and the invalidation and copy-back judging unit 41 are prepared for each of a plurality of cache ways, and the invalidating processing and the copy-back processing can be performed in the same manner as in the third embodiment.

Also, in the third embodiment, the write access to the main memory 102 is performed in the DMA transfer. However, the cache memory of the third embodiment can be applied to the read access to the main memory 102 performed in the DMA transfer. For example, before the DMA transfer, the CPU 100 requests the copy-back processing of the main memory 102 to write updated data of each transferring data block of the data memory 3 to the corresponding transferring area of the main memory 102. After the copy-back processing, the pieces of updated data of the transferring areas of the main memory 102 are read out under the control of the DMA controller 103. Therefore, the pieces of updated data stored in the transferring data blocks of the data memory 3 can be read out to another memory (not shown) except for the cache memory through the DMA controller 103 in the DMA transfer.

Embodiment 4

Figure 7:
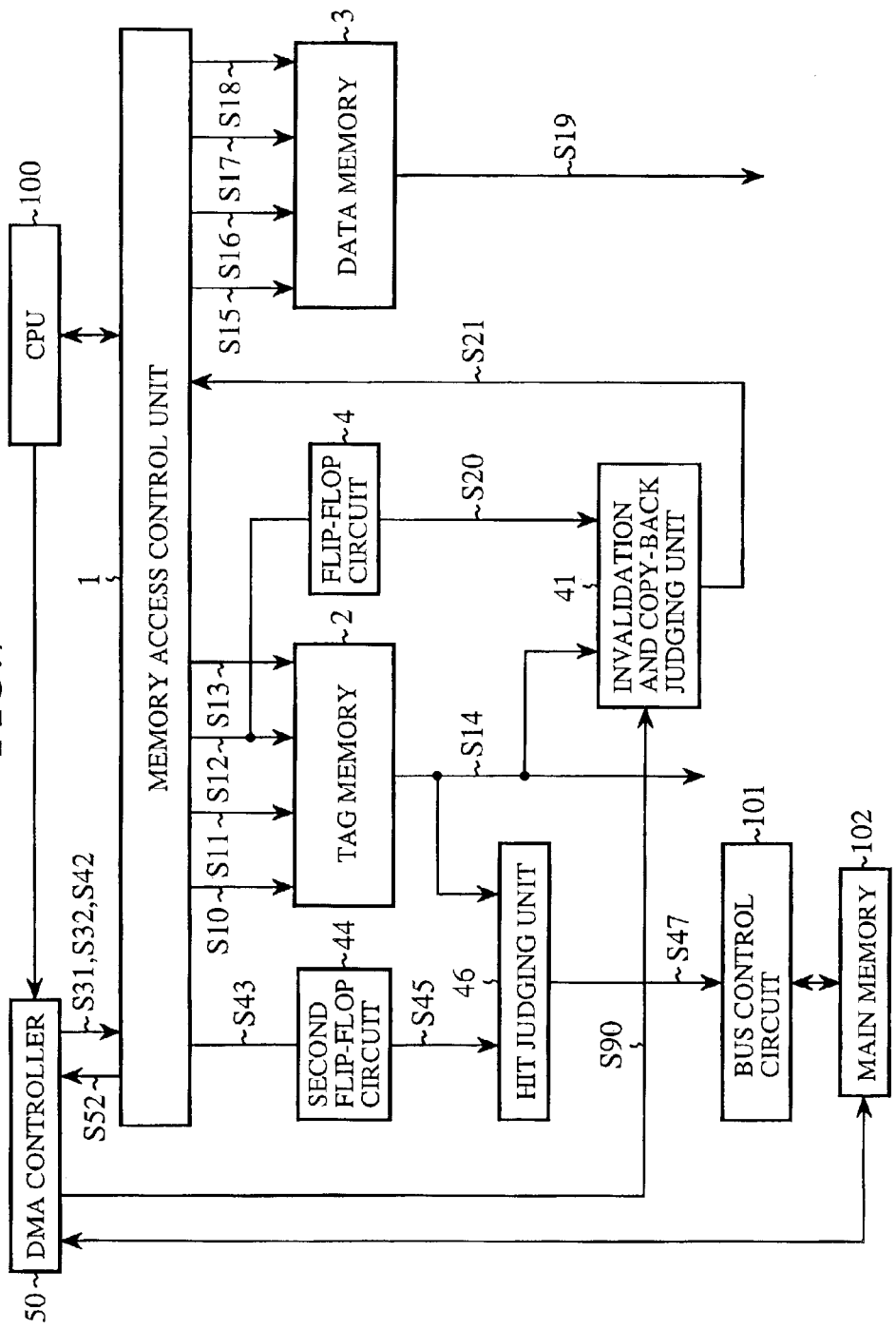
FIG. 7 is a block diagram of a cache memory according to the fourth embodiment of the present invention.
Figure 8:
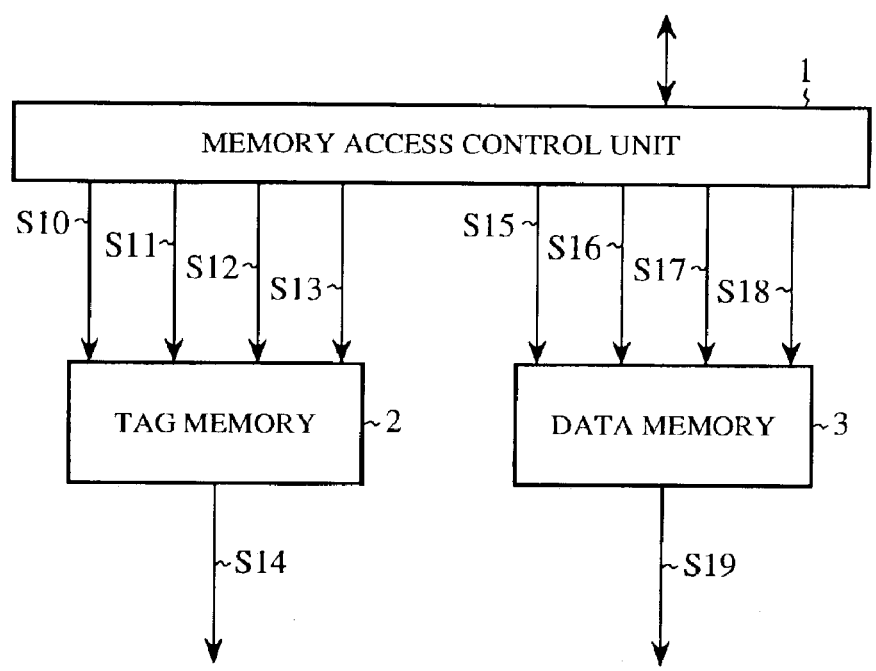
FIG. 8 is a block diagram of a conventional cache memory.
Figure 9:
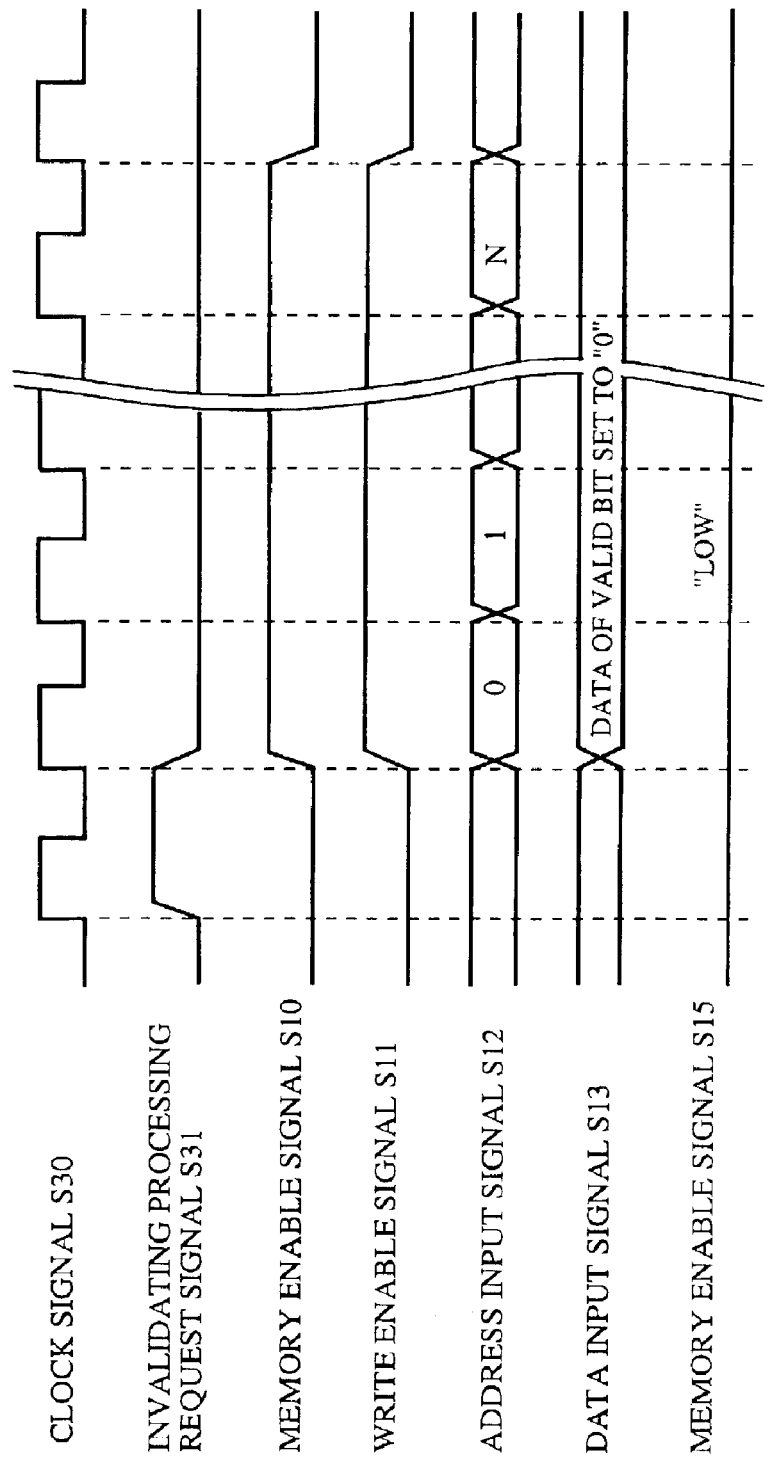
FIG. 9 is a timing chart of the invalidating processing performed for all areas of the conventional cache memory shown in FIG. 8.
Figure 10:
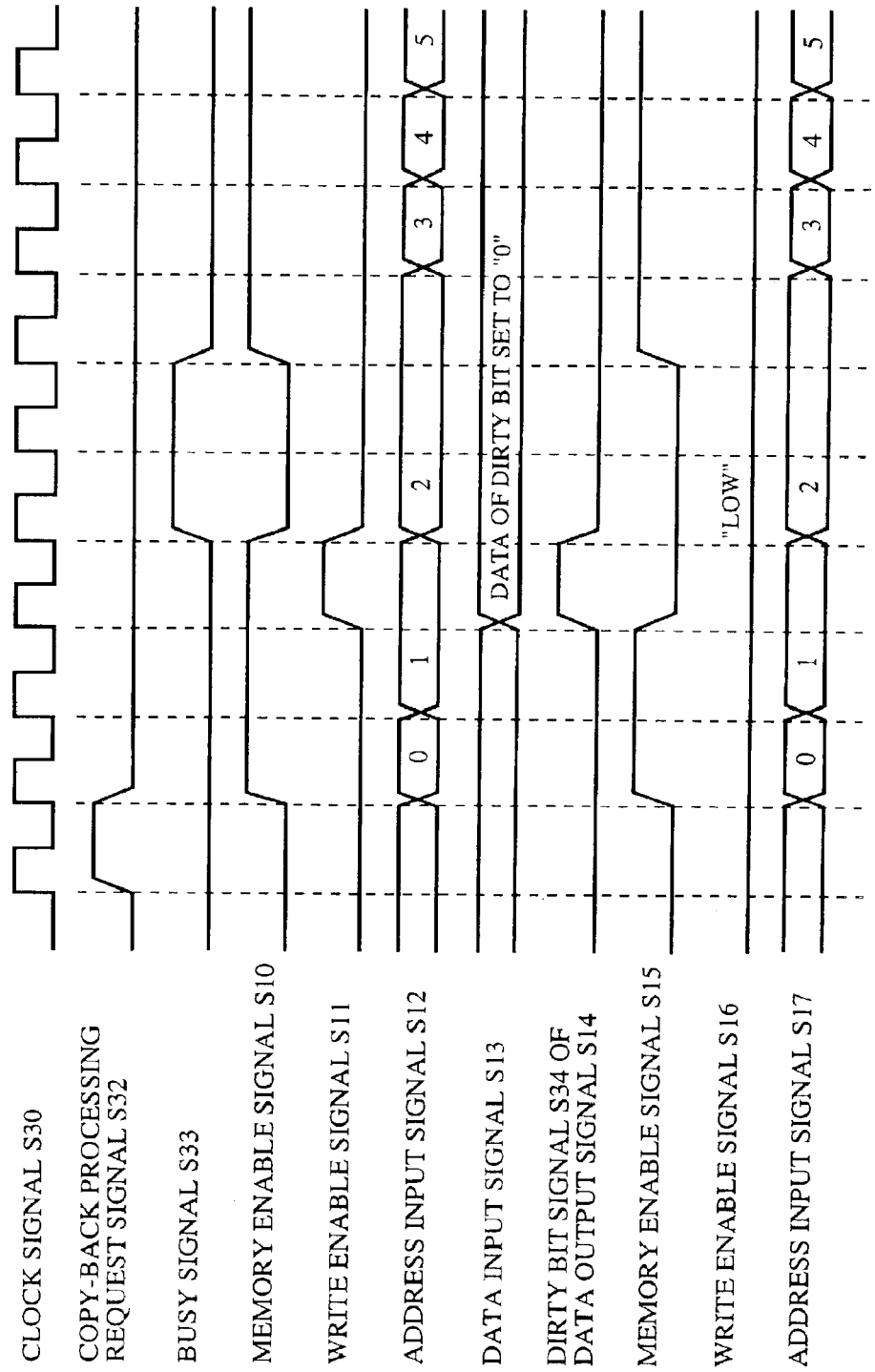
FIG. 10 is a timing chart of the copy-back processing performed for all areas of the conventional cache memory shown in FIG. 8.

FIG. 7 is a block diagram of a cache memory according to a fourth embodiment of the present invention. The constituent elements, which are the same as those shown in FIG. 5, are indicated by the same reference numerals as those of the constituent elements shown in FIG. 5, and additional description of those constituent elements is omitted.

As shown in FIG. 7, a cache memory comprises the memory access control unit 1, the tag memory 2, the data memory 3, the flip-flop circuit 4, the second flip-flop circuit 44, the hit judging unit 46 and the invalidation and copy-back judging unit 41. Also, the CPU 100, a DMA controller 50, the main memory 102 and the bus control circuit 101 are used for the DMA transfer performed in cooperation with the cache memory.

In the third embodiment, the area information specifying the invalidating areas of the main memory 102 or the area information specifying the writing-back areas of the main memory 102 is stored in the area specifying register 40 (refer to FIG. 5) according to the software executed in the CPU 100, and the invalidation and copy-back judging unit 41 refers to the area information of the area specifying register 40. In contrast, in this fourth embodiment, an area specifying signal S90 specifying either the invalidating areas of the main memory 102 corresponding to the invalidating processing or the writing-back areas of the main memory 102 corresponding to the copy-back processing is sent from the DMA controller 50 to the invalidation and copy-back judging unit 41.

Also, in the third embodiment, the invalidating processing request signal S31, the copy-back processing request signal S32 and the lock control signal S42 are sent from the CPU 100 to the memory access control unit 1. In contrast, in this fourth embodiment, an invalidating processing request signal S31, a copy-back processing request signal S32 and a lock control signal S42 are sent from the DMA controller 50 to the memory access control unit 1. Also, a status signal S52 is sent from the memory access control unit 1 to the DMA controller 50. The status signal S52 indicates that the invalidating processing or the copy-back processing is now performed for the cache memory.

Next, an operation of the cache memory will be described below.

In the same manner as in the third embodiment, an access address is sent from the CPU 100 to the memory access control unit 1, a tag address extracted from the access address is sent from the memory access control unit 1 to the hit judging unit 46 through the second flip-flop circuit 44, an index address extracted from the access address is sent from the memory access control unit 1 to the tag memory 2, tag information read out from the tag memory 2 is sent to the hit judging unit 46 and the invalidation and copy-back judging unit 41, and it is judged in the hit judging unit 46 whether or not the tag address output from the second flip-flop circuit 44 agrees with the tag address of the tag information output from the tag memory 2. In case of the agreement, information indicating the cache hit is sent to the bus control circuit 101, the data output signal S19 from the data memory 3 is sent to the CPU 100 under control of the bus control circuit 101, and data output from the data memory 3 is used in the CPU 100. Also, in case of the disagreement, information indicating the cache miss is sent to the bus control circuit 101, data from the main memory 102 is sent to the data memory 3 under control of the bus control circuit 101, and the cache replacement is performed by sending data of the main memory 102 to the data memory 3.

Next, the procedure of the write access to the main memory 102 performed for a DMA transfer will be described with reference to FIG. 6.

The procedure of the write access to the main memory 102 is performed under control of the DMA controller 50 to transfer data from another memory (not shown) to the main memory 102 in a DMA transfer.

When a DMA transfer for the main memory 102 is needed, a transfer start request signal (not shown) is sent to the DMA controller 50 by using a software architecture or a hardware element, a lock control signal S42 set to a high level is sent from the DMA controller 50 to the memory access control unit 1 in response to the transfer start request signal, and the cache memory such as the data memory 3 is locked by the memory access control unit 1 (step ST100). Thereafter, an area specifying signal S90 specifying the writing-back areas of the main memory 102 is sent from the DMA controller 50 to the invalidation and copy-back judging unit 41, and a copy-back processing request signal S32 is sent from the DMA controller 50 to the memory access control unit 1. Thereafter, the copy-back processing is started in response to the copy-back processing request signal S32 in the same manner as in the third embodiment (step ST101), and a status signal S52 is sent from the memory access control unit 1 to the DMA controller 50 to inform the DMA controller 50 that the copy-back processing is now performed in the cache memory. Therefore, in response to the status signal S52, the DMA transfer for the main memory is not started under control of the DMA controller 50.

When the copy-back processing is completed, the sending of the status signal S52 to the DMA controller 50 is stopped. In response to the information, an area specifying signal S90 specifying the invalidating areas of the main memory 102 is sent from the DMA controller 50 to the invalidation and copy-back judging unit 41, and an invalidating processing request signal S31 is sent from the DMA controller 50 to the memory access control unit 1. Thereafter, the invalidating processing is started in response to the invalidating processing request signal S31 in the same manner as in the third embodiment (step ST102), and a status signal S52 is sent from the memory access control unit 1 to the DMA controller 50 to inform the DMA controller 50 that the invalidating processing is now performed in the cache memory. Therefore, in response to the status signal S52, the DMA transfer for the main memory is not started under control of the DMA controller 50.

When the invalidating processing is completed, the sending of the status signal S52 to the DMA controller 50 is stopped. Therefore, a DMA transfer is started under control of the DMA controller 50 to write pieces of updated data sent from another memory (not shown) except for the cache memory to the transferring areas of the main memory 102 (step ST103). Thereafter, the DMA controller 50 judges whether or not the DMA transfer is completed (step ST104). In a case where the DMA controller 50 judges that the DMA transfer is completed, the lock signal S42 set to a low level is sent from the DMA controller 50 to the memory access control unit 1, and the cache memory such as the data memory 3 is released from the lock state under control of the memory access control unit 1 (step ST105). Therefore, the cache memory is set to a normal state. Accordingly, by sending the transfer start request signal to the DMA controller 50 according to a software architecture or a hardware element, the DMA transfer can be performed after the copy-back processing and the invalidating processing while setting the cache memory to the lock state.

In the fourth embodiment, the write access to the main memory 102 is performed in the DMA transfer. However, the cache memory of the fourth embodiment can be applied to the read access to the main memory 102 performed in the DMA transfer. For example, before the DMA transfer, a request is sent from the CPU 100 to the DMA controller 50, the DMA controller 50 requests the copy-back processing of the main memory 102 to write updated data of each transferring data block of the data memory 3 to the corresponding transferring area of the main memory 102. After the copy-back processing, the pieces of updated data of the transferring areas of the main memory 102 are read out under the control of the DMA controller 50. Therefore, the pieces of updated data stored in the transferring data blocks of the data memory 3 can be read out to another memory (not shown) through the DMA controller 50 in the DMA transfer.

As is described above, in the fourth embodiment, the same effects as those in the third embodiment can be obtained. Also, in a case where the DMA controller 50 gains access to the main memory 102 to perform the DMA transfer, the locking of the cache memory, the copy-back processing for the copy-back data blocks of the data memory 3 and the invalidating processing for the invalidating data blocks of the data memory 3 can be performed under the control of the DMA controller 50. Therefore, the load on the CPU 100 can be reduced.

What is claimed is:

1. A cache memory comprising:

a data memory for storing pieces of cached data in a plurality of data blocks respectively;

a tag memory for storing both address information specifying an address of a main memory corresponding to an address of each data block of the data memory and valid information indicating validity of the cache data of the data block of the data memory in a tag block of an address;

an area specifying unit for storing area information specifying an invalidating area of the main memory;

a judging unit for receiving the pieces of address information read out from all tag blocks of the tag memory one after another, and judging according to the pieces of address information and the area information stored by the area specifying unit whether or not each data block of the data memory corresponds to the invalidating area of the main memory; and an access control unit for controlling the tag memory to replace the valid information, which is stored in a specific tag block of the tag memory corresponding to a specific data block of the data memory, with valid information indicating invalidity in a case where the judging unit judges that the specific data block of the data memory corresponds to the invalidating area of the main memory.

2. The cache memory according to claim 1, wherein a tag address is output from an index address of the tag memory each time a signal indicating the index address is output from the address control unit and is input to the tag memory, the cached data is output from an index address of the data memory each time a signal indicating the index address is output from the address control unit and is input to the data memory, and a combined address denoting an address of the main memory corresponding to the index address of both the tag memory and the data memory is produced as the address information by the judging unit by combining the tag address derived from the index address and the index address indicated by the signal.

3. A cache memory comprising:

a data memory for storing pieces of cached data in a plurality of data blocks respectively;

a tag memory for storing both address information specifying an address of a main memory corresponding to an address of each data block of the data memory and dirty information indicating necessity or non-necessity of the writing back of the cached data of the data block of the data memory to the main memory in a tag block of an address;

an area specifying unit for storing area information specifying a writing-back area of the main memory;

a judging unit for receiving the pieces of address information read out from all tag blocks of the tag memory one after another, and judging according to the pieces of address information and the area information stored by the area specifying unit whether or not each data block of the data memory corresponds to the writing-back area of the main memory; and an access control unit for writing back the cached data of a specific data block of the data memory to the writing-back area of the main memory, in a case where the judging unit judges that the specific data block of the data memory corresponds to the writing-back area of the main memory, and controlling the data memory to output the cached data of each data block of the data memory.

4. A cache memory comprising:

a data memory for storing pieces of cached data in a plurality of data blocks respectively;

a tag memory for storing, in a tag block of an address, address information specifying an address of a main memory corresponding to an address of each data block of the data memory, valid information indicating validity or invalidity of the cache data of the data block of the data memory and dirty information indicating necessity or non-necessity of the writing back of the cached data of the data block of the data memory to the main memory;

an area specifying unit for storing area information specifying an invalidating area of the main memory in a case of the necessity of invalidating processing and storing area information specifying a writing-back area of the main memory in a case of the necessity of copy-back processing;

a judging unit for receiving the pieces of address information read out from all tag blocks of the tag memory one after another, and judging according to the pieces of address information and the area information stored by the area specifying unit whether or not each data block of the data memory corresponds to the invalidating area of the main memory or the writing-back area of the main memory; and an access control unit for controlling the tag memory to store the valid information indicating invalidity in a specific tag block of the tag memory corresponding to a specific data block of the data memory in the invalidating processing in a case where the judging unit judges that the specific data block of the data memory corresponds to the invalidating area of the main memory, writing back the cached data of a specific data block of the data memory to the writing-back area of the main memory in the copy-back processing in a case where the judging unit judges that the specific data block of the data memory corresponds to the writing-back area of the main memory, and controlling the data memory to output the cached data of each data block of the data memory corresponding to the tag block of the tag memory in which the valid information indicating the validity of the cache data of the data block of the data memory is stored.

5. The cache memory according to claim 4, wherein a plurality of invalidating areas of the main memory including both a transferring area of the main memory, to which a bus master not gaining access to the cache memory writes transferring data, and a specific area of the main memory adjacent to the transferring area are specified by the area information of the area specifying unit, a plurality of writing-back areas of the main memory including both the transferring area and the specific area of the main memory are specified by the area information of the area specifying unit, the access control unit locks the data memory not to write any of pieces of data of a plurality of areas of the main memory corresponding to the data blocks of the data memory to the corresponding data block of the data memory, the copy-back processing is performed for each writing-back area specified by the area information of the area specifying unit under control of the access control unit on condition that the access control unit locks the data memory, the invalidating processing is performed for each invalidating area specified by the area information of the area specifying unit under control of the access control unit on condition that the access control unit locks the data memory, the transferring data is written to the transferring area of the main memory by the bus master on condition that the access control unit locks the data memory, and the access control unit releases the data memory from a lock state.

6. The cache memory according to claim 5, wherein the locking of the data memory, the copy-back processing, the invalidating processing and the release of the data memory from the lock state are performed under control of a central control unit by sending control signals from the central control unit to the access control unit.

7. The cache memory according to claim 5, wherein the locking of the data memory, the copy-back processing, the invalidating processing and the release of the data memory from the lock state are performed under control of the bus master by sending control signals from the bus master to the access control unit.

8. The cache memory according to claim 4, wherein a plurality of writing-back areas of the main memory including a transferring area of the main memory, from which a bus master not gaining access to the cache memory reads out, are specified by the area information of the area specifying unit, the copy-back processing is performed for each writing-back area specified by the area information of the area specifying unit under control of the access control unit, the transferring data is read out from the transferring area of the main memory by the bus master.

9. The cache memory according to claim 8, wherein the copy-back processing is performed under control of a central control unit by sending a control signal from the central control unit to the access control unit.

10. The cache memory according to claim 8, wherein the copy-back processing is performed under control of the bus master by sending a control signal from the bus master to the access control unit.

* * * * *